United States Patent [19]

Date et al.

[11] Patent Number: 5,498,843
[45] Date of Patent: Mar. 12, 1996

[54] CONTROL KEY MULTIPLE ELECTRICAL CONTACT SWITCHING DEVICE

[75] Inventors: Toshinori Date; Yasuo Takasu, both of Tokyo, Japan

[73] Assignee: Sega Enterprises, Ltd., Tokyo, Japan

[21] Appl. No.: 245,446

[22] Filed: May 17, 1994

Related U.S. Application Data

[63] Continuation-in-part of Ser. No. 83,670, Jun. 28, 1993.

[30] Foreign Application Priority Data

Jun. 30, 1992 [JP] Japan ................................. 4-173020

[51] Int. Cl.⁶ .................................................. H01H 25/04
[52] U.S. Cl. ................................... 200/6 A; 200/5 A
[58] Field of Search .................................. 200/5 R, 5 A, 200/6 A, 17 R, 18, 512–517, 339, 553, 557; 273/148 B, 438; 345/156, 161; 341/20

[56] References Cited

U.S. PATENT DOCUMENTS

| | | | |
|---|---|---|---|
| 4,246,452 | 1/1981 | Chandler | 200/5 A |
| 4,414,438 | 11/1983 | Maier et al. | 200/6 A |
| 4,488,017 | 12/1984 | Lee | 200/5 R |
| 4,493,219 | 1/1985 | Sharp et al. | 73/862.05 |
| 4,493,959 | 1/1985 | Viebrantz | 200/517 |
| 4,614,847 | 9/1986 | Sasao | 200/6 A |
| 4,687,200 | 8/1987 | Shirai | 200/5 A X |
| 4,710,602 | 12/1987 | Baity et al. | 200/315 |
| 4,896,003 | 1/1990 | Hsieh | 200/6 A |
| 4,918,264 | 4/1990 | Yamamoto et al. | 200/5 R |
| 4,992,631 | 2/1991 | Gee | 200/5 A |
| 5,012,230 | 4/1991 | Yasuda | 340/706 |
| 5,089,677 | 2/1992 | Satou | 200/339 |
| 5,396,030 | 3/1995 | Matsumiya et al. | 200/6 A |

FOREIGN PATENT DOCUMENTS

| | | | |
|---|---|---|---|
| 0088365 | 9/1983 | European Pat. Off. | H01H 3/12 |
| 0477098 | 3/1992 | European Pat. Off. | |
| 0477098A2 | 3/1992 | European Pat. Off. | G06K 11/18 |
| 0477098A3 | 3/1992 | European Pat. Off. | G06K 11/18 |
| 2531215 | 2/1984 | France | H01H 13/70 |
| 2613850 | 10/1988 | France | G06F 3/033 |
| 3843650 | 7/1989 | Germany | H01H 15/00 |
| 63-137427 | 9/1988 | Japan | H01H 25/04 |
| 3-50594 | 10/1991 | Japan . | |
| 4-42029 | 4/1992 | Japan | H01H 25/00 |
| 6-52757 | 2/1994 | Japan | H01H 25/04 |
| 2204387 | 11/1988 | United Kingdom . | |
| 90/15427 | 12/1990 | WIPO | H01H 25/04 |

*Primary Examiner*—J. R. Scott
*Attorney, Agent, or Firm*—Michael N. Meller

[57] ABSTRACT

A control key device includes a casing having a generally dome-shaped portion provided at an arbitrary part of the casing, the dome-shaped portion having a top surface and a hole provided at a central part of the dome-shaped portion, a substrate provided within the casing and having a plurality of electrical contacts, a resilient member provided on the substrate and having a plurality of bulges at positions corresponding to the electrical contacts of the substrate, each of the bulges having an electrically conductive portion which makes electrical contact with a corresponding one of the electrical contacts when the bulge is resiliently deformed, a contact pressing member provided on the resilient member and having a plurality of legs at positions corresponding to the bulges of the resilient member, and a key secured on the contact pressing member via the hole in the dome-shaped portion of the casing, the key having a home position and a tilted position. One of the legs of the contact pressing member resiliently deforms a corresponding one of the bulges of the resilient member to achieve electrical contact between the electrically conductive portion of the corresponding one bulge and a corresponding one of the electrical contacts of the substrate in the tilted position of the key, and the key has a sliding surface which makes sliding contact with the top surface of the dome-shaped portion of the casing when tilting from the home position to the tilted position.

34 Claims, 18 Drawing Sheets

CONTROL KEY MULTIPLE ELECTRICAL CONTACT SWITCHING DEVICE

This application is a Continuation-In-Part Application of a U.S. patent application Ser. No.083,670 filed Jun. 28, 1993.

BACKGROUND OF THE INVENTION

The present invention relates to control key devices, and more particularly to a control key device which may be used as an input device for specifying a moving direction of a displayed character or the like on a video game apparatus or a portable electronic game apparatus.

In such a control key device, an appropriate operating force is applied by an operator to a contact member thereof. Then, the contact member is thus transformed. The transformation of the contact member results in some contacts coming in contact with each other. Some kind of control key devices further have the following functions. One of such kind of control key devices has a plurality of pairs of contacts. Electrical contact is established in a desired pair of contacts from among the plurality of pairs of contacts as a result of an appropriate operating force being applied by an operator. Further, the establishment of electrical contact in a desired pair of contacts from among the plurality of pairs may indicate a desired direction of a plurality of directions. The desired direction corresponds to the pair of contacts in which the electrical contact is established. The plurality of directions may be assigned by the plurality of pairs of contacts. Thus, the operator may specify or select a desired direction from among a plurality of directions using the above kind of control key device by appropriately operating them. This appropriate operation of the control key device is executed by movement of a finger of the operator, which finger touches the key of the control key device.

In the known art, such kind of control key device is used in computers, for example, video game apparatus including video game apparatus of business use or video game apparatus of personal use. In these video game apparatus, a display screen such as using a liquid crystal display device is provided. In this display screen, a character is moved in response to an operation performed on the video game apparatus by an operator. The character is an object representing in the display screen. The operator may specify the movement of the character using the control key device mentioned above. Using the control key device, the operator may specify or may select a direction in which the character moves. The direction selected is selected from various directions, for example, 4 directions, the top, bottom, right and left, or 8 directions, the top, bottom, right, left, top left, top right, bottom left, and bottom right.

The Japanese Utility-Model Publication No. 3-50594 (Japanese Utility-Model Application No. 61-58549) discloses such a conventional control key device. The disclosed control key device is such as shown in FIG. 1. In FIG. 1, a sectional view is shown.

In FIG. 1, the control key device is operated as follows. The operator may push the control key device on a pad 110. Pushing of the center of the pad 110 downward in FIG. 1 causes the supporting-point member 113 to move downward. A supporting member 122 is elastically transformed as a result of the pad 110 being pushed downward as mentioned above. This elastic transformation of the supporting member 122 results in the downward motion of the supporting-point member 113. This downward motion of the supporting-point member 113 results in it touching a substrate 140. Thus, the supporting member 113 will then act as a supporting point with respect to a motion of the pad 110.

This control key device has a construction such that the following state is established. Even the pad 110 has been moved downward as mentioned above, none of the conductive rubber plates 130a and 130b comes in contact with any of electrical contact portions 141 and 142. The conductive rubber plates 130a and 130b are fixed on a supporting member 133. The electrical contact portions are provided on the substrate 140.

Then, the operator may push the projection 111a as well as pushing the center of the pad 110 as mentioned above. Then, the operator pushes the projection 111a as mentioned above, a disk 112 as well as the pad 110 accordingly tilts with respect to the substrate 140. This tilting is executed with respect to the supporting point formed by the supporting-point member 113. As a result, the tilting of the disk 112 results in the conductive rubber plate 130a touching the electrical contact portion 141. This results in a pair of contacts constituting the electrical contact portion 141 electrically coming in contact with each other. That is, electrical contact is established in the electrical contact portion 141. This electrical contact results in a predetermined electrical circuit, not shown, being closed.

A drawback involved in such a conventional control key device as shown in FIG. 1 will now be described. In the control key device, the supporting-point member 113 is rigidly fixed on the pad 110. The supporting-point member 113 is used for forming the supporting point as mentioned above. Some force may be applied to the pad 110. Then, this force is transmitted to the substrate 140 via the supporting-point member 113. Thus, so a strong force may be applied to the pad as to damage wirings themselves or wiring connections formed on the substrate 140.

SUMMARY OF THE INVENTION

Accordingly, it is a general object of the present invention to provide a novel and useful control key device in which the problems described above are eliminated.

An object of the present invention is to provide a control key device. In the control key device, a shock applied on a key pad is prevented from being directly transmitted to a substrate which acts as a part of the control key device. Thus, such a shock may not result in damage occurring in wirings themselves or wiring connections formed on the substrate.

To achieve the object of the present invention, the control key device according to the present invention comprises: at least one second contact portion wherein an operating force applied thereto may cause said second contact portion to touch said first contact portion so that predetermined electrical contact is established, the causing of said second contact portion touching said first contact portion being a result of an operating force elastically transforming the shape of said contact member;

wherein said control key device further comprising tilting means for tilting said contact member with respect to said contact plate in response to an operating force being applied to said contact member, said tilting occurring as a result of said tilting means defining a manner of said elastic transformation of said contact member.

In the above-mentioned construction, the control key device operates as follows. The operator may push the control key device on the contact member with his or her finger. The operator intends to establish the predetermined electrical contact by this pushing. This pushing causes the contact member to tilt with respect to the contact plate as the effect of the tilting means. Simultaneously with the tilting, the shape of the contact member is elastically transformed. Thus, the transformation of the contact member results in the predetermined electrical contact being established as a result of the first contact portion touching the second contact portion. Then, after the operator releases the pushing force applied to the contact member, the tilting and transformation of the contact member are thus canceled. This removal occurs as a result of the elastic recovery force being applied by and being applied to the contact member. Thus, the contact member is returned to a neutral position in which none of the operation force is applied to the contact member. Thus, the established electrical contact is canceled.

Further, the control key device according to the present invention may further comprises a force-applying means for applying a returning force to said contact member, wherein said returning force is effected so that said contact member is returned to a neutral position when said contact member goes out from said neutral position as a result of tilting with effect of said tilting means, in which neutral position said contact member is located when no operating force is applied to said contact member.

This provision of the above-mentioned force-applying means may create an improved "click feeling". The operator feels the click feeling when he or she pushes the contact member and/or releases the pushing force applied on the contact member. The operator feels this click feeling through his or her finger in response to the finger pushing the contact member of the finger releasing the pushing force. Such a click feeling is useful. That is, the operator's operation performed on the control key device may be acknowledged by the click feeling being felt in response to the operation.

The control key device according to the present invention may further comprise a force adjusting means for adjusting an amount of said returning force.

By the force adjustment means, the pushing force constituting the above mentioned click feeling may be adjusted. Thus, a desired level of the pushing force is realized in the click feeling and thus the desired click feeling may be created.

Another and more specific object of the present invention is to provide a control key device which can positively prevent sticking of a key at a tilted position so that the tilted key will always return to a home position by itself.

Still another object of the present invention is to provide a control key device comprising a casing having a generally dome-shaped portion provided at an arbitrary part of the casing, the dome-shaped portion having a top surface and a hole provided at a central part of the dome-shaped portion, a substrate provided within the casing and having a plurality of electrical contacts, a resilient member provided on the substrate and having a plurality of bulges at positions corresponding to the electrical contacts of the substrate, each of the bulges having an electrically conductive portion which makes electrical contact with a corresponding one of the electrical contacts when the bulge is resiliently deformed, a contact pressing member provided on the resilient member and having a plurality of legs at positions corresponding to the bulges of the resilient member, and a key secured on the contact pressing member via the hole in the dome-shaped portion of the casing, the key having a home position and a tilted position, where the contact pressing member is approximately level and the legs rest on the corresponding bulges of the resilient member in the home position of the key, one of the legs of the contact pressing member resiliently deforms a corresponding one of the bulges of the resilient member to achieve electrical contact between the electrically conductive portion of the corresponding one bulge and a corresponding one of the electrical contacts of the substrate in the tilted position of the key, and the key has a sliding surface which makes sliding contact with the top surface of the dome-shaped portion of the casing when tilting from the home position to the tilted position and being automatically returned from the tilted position to the home position by a resilient restoration force exerted by the resilient member. According to the control key device of the present invention, it is possible to improve the response characteristic of the control key device. That is, the light and smooth touch (so-called feather touch) key operation becomes possible, and a quick operation of the key becomes possible.

Another object of the present invention is to provide a control key device of the type described immediately above and further comprising preventing means for preventing the key from sticking at the tilted position or an intermediate position between the tilted position and the home position. According to the control key device of the present invention, it is possible to prevent the key from sticking at the tilted position or an intermediate position between the home position and the tilted position.

A further object of the present invention is to provide the control key device described immediately above, wherein the preventing means includes a first gap formed between the sliding surface of the key and the top surface of the dome-shaped portion of the casing at the home position of the key. According to the control key device of the present invention, since the stroke required to tilt the key from a standby state is small, it is possible to minimize the gap between the key and the wall of the casing surrounding the key. This minimized gap reduces the space required to provide the key. In addition, it is possible to prevent dust particles or the like from easily entering within the control key device via this minimized gap, and also prevent the operator's finger tip from being caught within the minimized gap.

Another object of the present invention is to provide the control key device described above, wherein the contact pressing member includes a generally spherical surface which makes sliding contact with a bottom surface of the dome-shaped portion of the casing.

Still another object of the present invention is to provide the control key device of the type described immediately above, wherein the preventing means comprises a first gap formed between the sliding surface of the key and the top surface of the dome-shaped portion of the casing at the home position of the key, and a second gap formed between the electrically conductive portion of each of the bulges of the resilient member and the corresponding electrical contact of the substrate at the home position of the key, where the second gap is greater than the first gap. According to the control key device of the present invention, since the stroke required to tilt the key from a standby state is small, it is possible to minimize the gap between the key and the wall of the casing surrounding the key. This minimized gap reduces the space required to provide the key. In addition, it is possible to prevent dust particles or the like from easily entering within the control key device via this minimized gap, and also prevent the operator's finger tip from being caught within the minimized gap.

Other objects and further features of the present invention will be apparent from the following detailed description when read in conjunction with the accompanying drawings.

DESCRIPTION OF PREFERRED EMBODIMENTS

A first embodiment of the control key device according to the present invention will now be described with reference to FIGS. 2 and 3.

Figure 2:
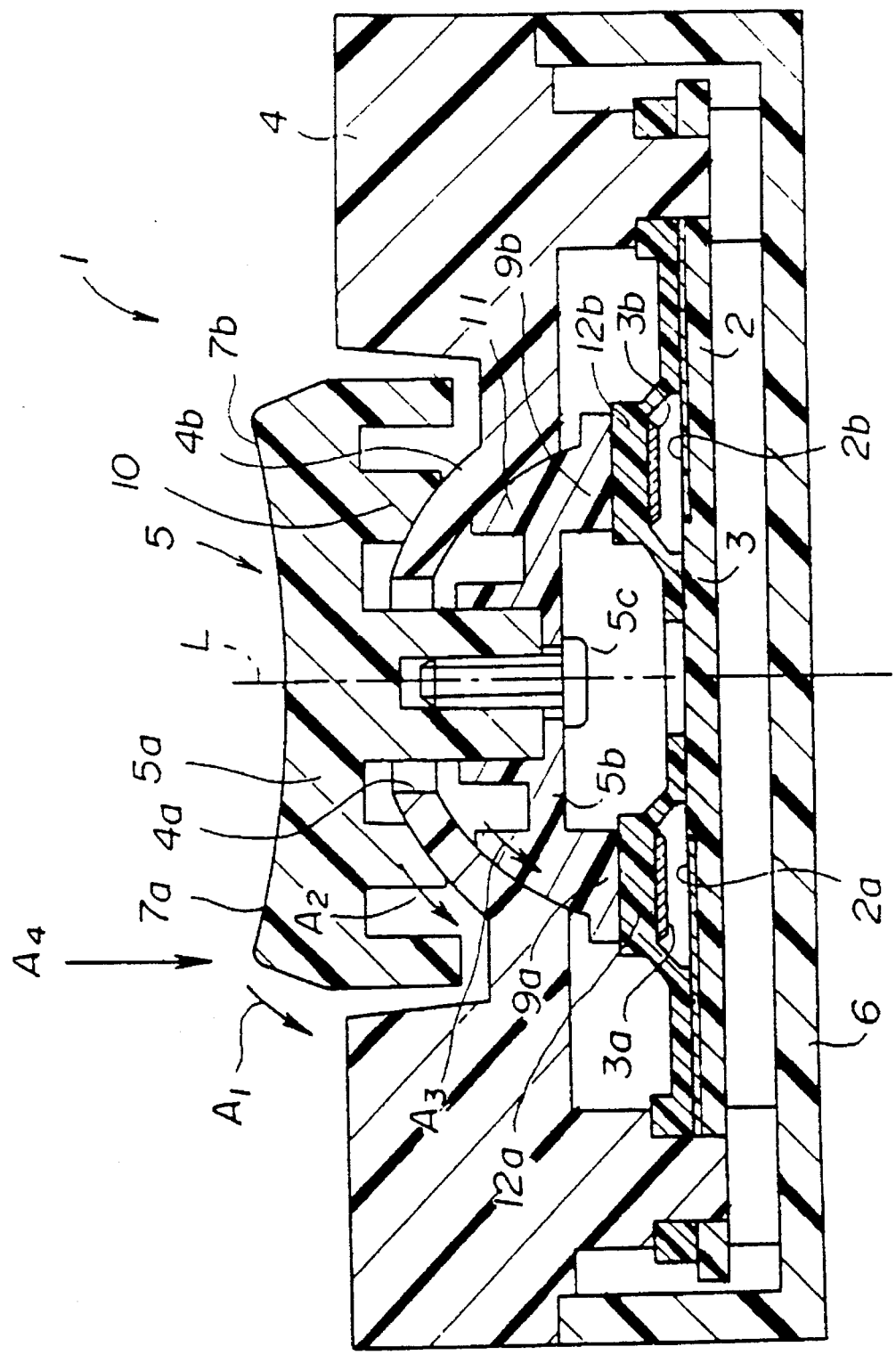
FIG. 2 shows a sectional view of a first embodiment of a control key device according to the present invention.
Figure 3:
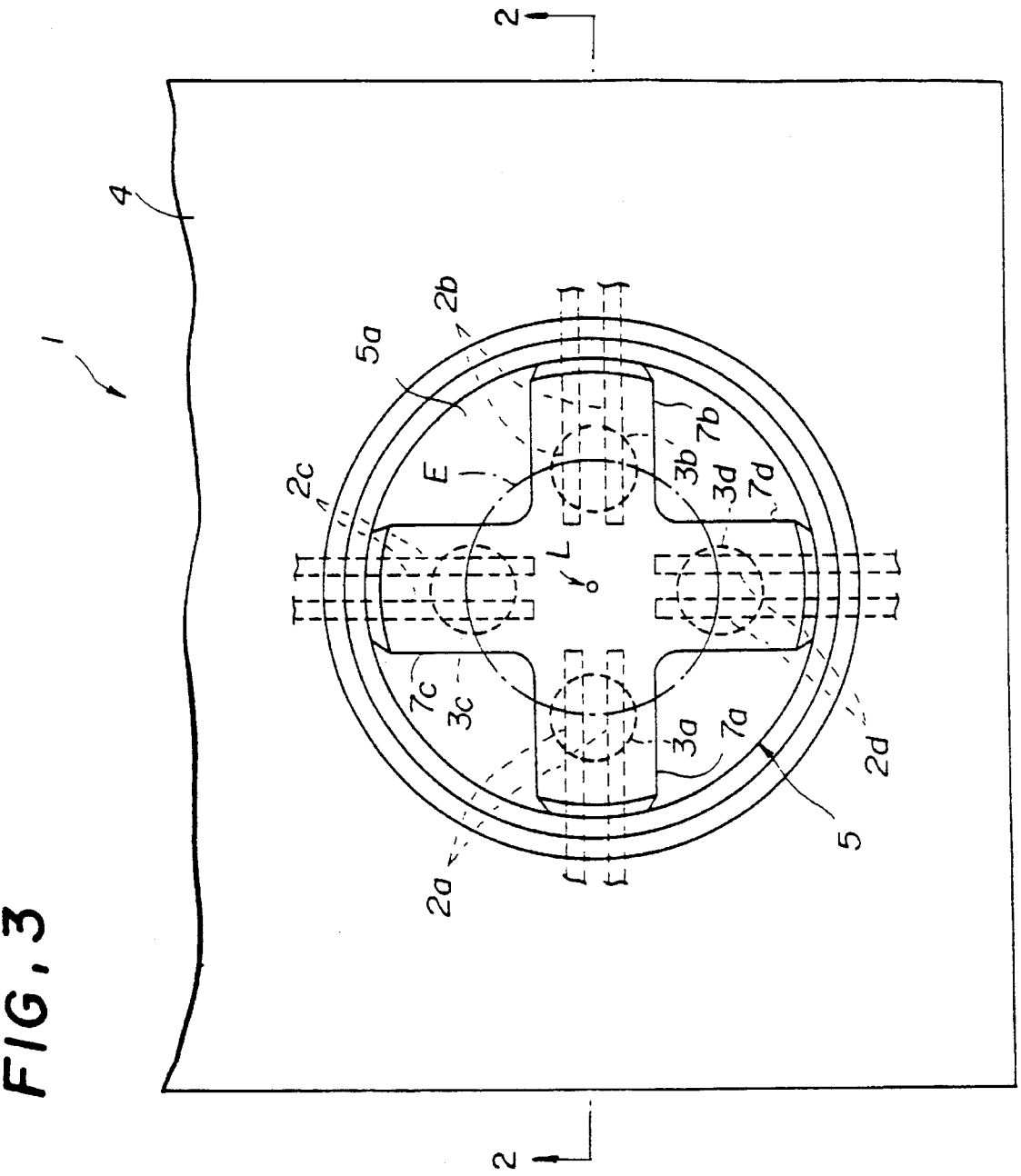
FIG. 3 shows a plan view of the first embodiment shown on FIG. 2.

The control key device 1 shown in FIGS. 2 and 3 comprises a circuit substrate 2, an elastic member 3, a front housing 4, a pad 5 and a rear housing 6. Total 4 pairs of electrical contacts 2a, 2b a 2c and 2d are provided on the circuit substrate 2. As shown in FIG. 3, four pieces of conductive portions 3a, 3b, 3c and 3d are provided on the conductive elastic member 3. Each of the conductive portions 3a, 3b, 3c and 3d is aligned with a respective one pair of the pairs of electrical contacts 2a to 2d. Thus, each of the conductive portions 3a, 3b, 3c and 3d is located just above (in FIG. 2) of a respective one pair of the pairs of electrical contacts 2a to 2d.

The shape of the elastic member 3 is transformed as result of a pushing force being applied thereto from the top thereof in FIG. 2. This transformation may cause a conductive portion from among the conductive portions 3a to 3d to come in contact with a pair of electrical contacts from among the pairs of electrical contacts 2a to 2d. The come-in-contact pair of electrical contacts corresponds to, in its location, the coming-in-contact conductive portion. The coming-in-contact conductive portion is determined from among the conductive portions 3a to 3d according to the manner in which the elastic member transforms.

The above-mentioned coming-in-contact between the conductive portion and the pair of electrical contacts results in the pair of electrical contacts completing the circuit.

The front housing 4 is used for covering the front surface of the circuit substrate 2. The pairs electrical contacts 2a to 2d are provided on the front surface of the substrate 2. The rear housing 6 is used for covering the rear surface of the substrate 2.

The pad 5 comprises a key member 5a and a contact pushing member 5b. The key member 5a is fixed to the contact pushing member 5b through the screw 5c. The key member 5a constitutes a key operating part. The key operating part is exposed outside of the front housing 4 so that the operator may push the key operating part. The contact pushing member 5b is located so that the contact pushing member may be used for pushing the elastic member 3.

The contact pushing member 5b will now be described in detail. The contact pushing member 5b has four foot portions 9a, 9b, 9c and 9d. The elastic member has four force bearing portions 12a, 12b, 12c and 12d. The force bearing portions 12a to 12d are respectively aligned with the foot portions 9a to 9d of the contact pushing member 5b. The conductive portions 3a to 3d are respectively fixed on the force bearing portions 12a to 12d. Each of the foot portions 9a to 9d comes in contact with and pushes from the top in FIG. 2 a respective one of the conductive portions 3a to 3d via a respective one of the force bearing portions 12a to 12d.

Projections 7a, 7b, 7c and 7d are provided with the key member 5a at the top thereof. The projections 7a to 7d are exposed outside of the front housing 4. The projections 7a to 7d respectively extend radially in four directions, the top, bottom, right and left in FIG. 3. Each of the projection 7a to 7d is aligned with a respective pair of contacts of the pairs of contacts 2a to 2d.

The front housing 4 has a through hole 4a which has a center axis identical to a center line L of a circle E shown in FIG. 3. The pairs of electric contacts 2a to 2d are arranged so that they are located on the outline of the circle E as shown in FIG. 3. The front housing has a dome portion 4b extending radially at the circumference of the through hole 4a. The dome portion 4b forms a substantially half-sphere shape. The concavity surface of the half-sphere shape faces to the substrate 2.

The key member 5a is fixed to the contact pushing member 5b via the through hole 4a of the front housing 4:

The key member 5a is firmly fixed to the member 5b with a screw 5c." The key member 5a has a sliding portion 10 while the contact pushing member 5b has a sliding portion 11. The sliding portions 10 and 11 are respectively in contact with the outside and inside surfaces of the dome portion 4b as shown in FIG. 2.

Operation of the above-mentioned control key device 1 will now be described.

The operator may intend to establish electrical contact of or a closed circuit between the pair 2a of electrical contacts. In this housing, the operator should put his or her finger on the top of the key member 5a, and then should push the projection 7a downward according to the arrow $A_4$ shown in FIG. 2. This pushing force causes the following operation in the control key device 1. The sliding portion 10 of the key member 5a slides on the outside surface of the dome portion 4b according to the arrow $A_2$ shown in FIG. 2, while the sliding portion 11 of the contact pushing portion 5b slides on the inside surface of the dome portion 4b according to the arrow $A_3$ shown in FIG. 2.

Thus, the pad 5 tilts or rotates counter-clock-wise according to the arrow $A_1$ shown in FIG. 2. As a result, the left side foot portion 9a of the contact pushing member 5b pushes the conductive portion 3a of the elastic portion 3 downward in FIG. 2 accordingly. Thus, the pushed elastic portion 3 is elastically transformed so that the conductive portion 3a closed-circuits the pair 2a of electrical contacts.

Then, when the pushing force applied to the projection 7a by the operator's finger is released, the control key device operates as follows. The elastic recovery force of the elastic member 3 effects so as to make the force bearing portion 12a push the foot portion 9a upward in FIG. 2. As a result, the sliding portion 10 of the key member 5a slides on the outside surface of the dome portion 4b according to the reverse direction of the arrow $A_2$ shown in FIG. 2, while the sliding portion 11 of the contact pushing portion 5b slides on the inside surface of the dome portion 4b according to the reverse direction of the arrow $A_3$ shown in FIG. 2.

Thus, the pad 5 rotates clock-wise according to the reverse direction of the arrow $A_1$ shown in FIG. 2 so that the tilting of the pad 5 is canceled. Thus, the pad 5 returns to its neural position in which position no operating force by the operator is applied to the pad 5. As a result, the downward pushing force by the left side foot portion 9a of the contact pushing member 5b applied to the conductive portion 3a of the elastic portion 3 in FIG. 2 is canceled. Thus, the elastic transformation of the elastic portion 3 is canceled so that the closed-circuiting by the conductive portion 3a between the pair 2a of electrical contacts is canceled.

Figure 1:
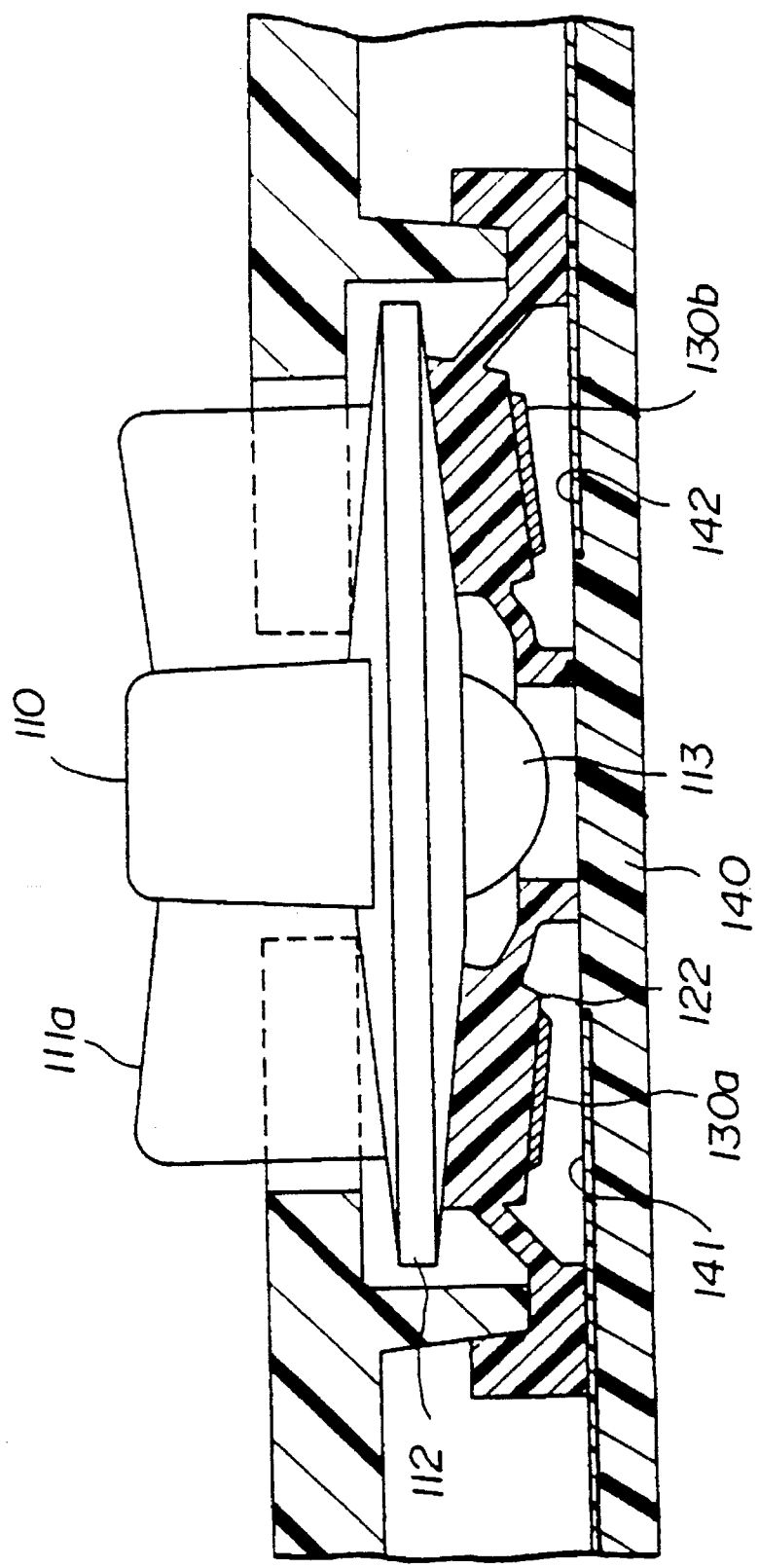
FIG. 1 shows a sectional view of a conventional control key device.

By the construction of the control key device 1, the following advantages can be given. The supporting-point member 113 of the conventional device as shown in FIG. 1 becomes unnecessary. This is because in the device 1 shown in FIG.2 the pad 5 may rotate according to sliding motion of the pad 5 on the surfaces of the dome portion 4b through the sliding portions 10 and 11 as mentioned above. In this construction shown in FIG. 2, the dome portion 4b guides the tilting or rotating motion of the pad 5. This eliminates the supporting-point portion 113 which forms the supporting point by engaging the substrate as mentioned above. The construction shown in FIG. 2 as well as the construction shown in FIG. 1 can ensure the establishment of a desired pair of electrical contacts being closed-circuited or come in contact with each other, as a result of an appropriate operation to be performed by the operator.

This eliminating of the supporting-point member 113 may create the following advantage. Even if a strong shock is applied to the top of the pad 5 downward, the strong shock is prevented from being directly transmitted to the substrate 2. Thus, damage occurring in wiring themselves or wiring connections may be prevented.

Figure 4:
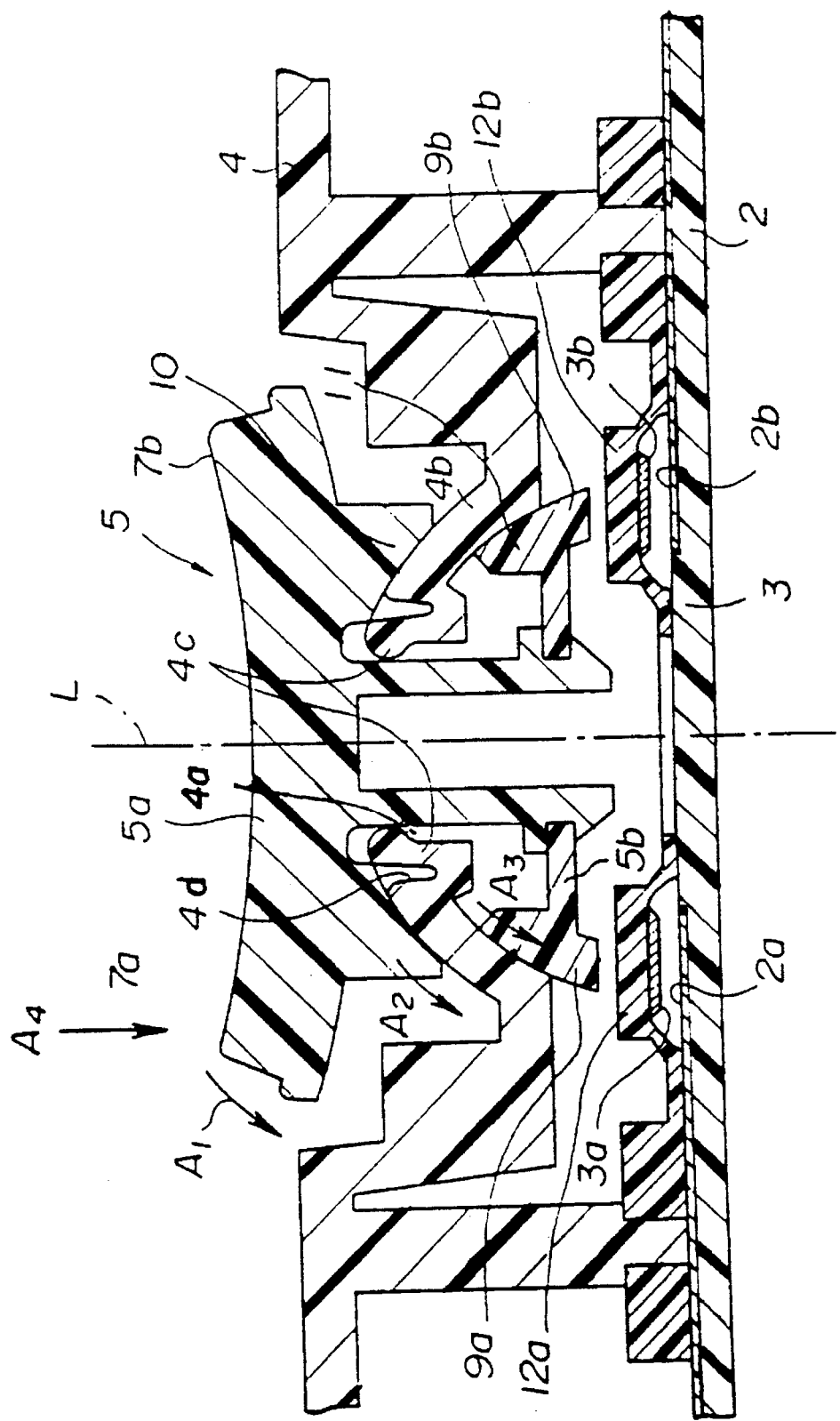
FIG. 4 shows a sectional view of a second embodiment of the control key device according to the present invention.
Figure 5:
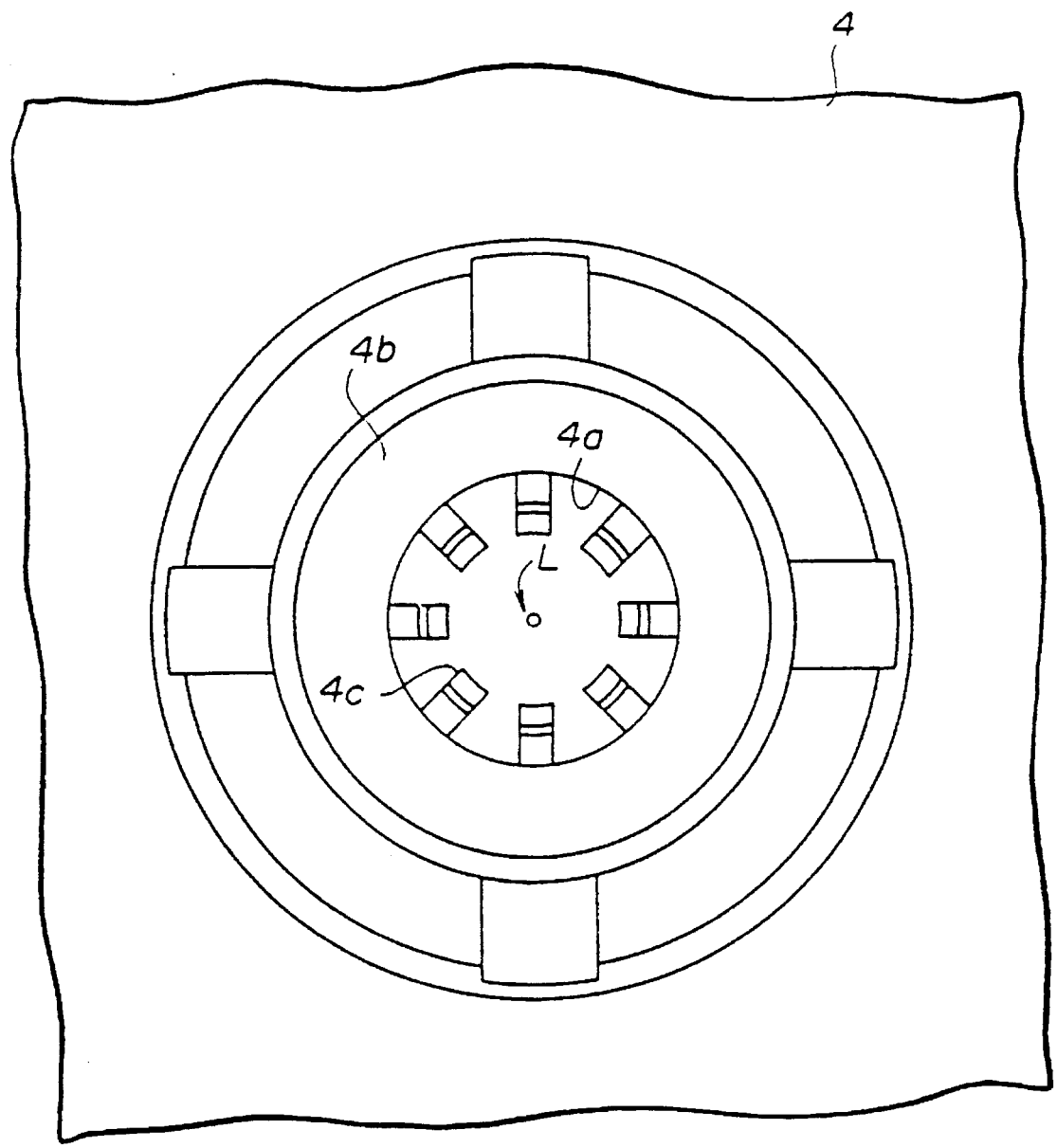
FIG. 5 shows a plan view of a front housing of the second embodiment shown in FIG. 4.

A second embodiment of the control key device according to the present invention will now be described with reference to FIGS. 4 and 5. In FIGS. 4 and 5, the same reference numbers as those in FIG. 2 are assigned to portions having the same names as those in FIG. 2. Then, features of the second embodiment of the control key device will be described later, which features are different from those in the device shown in FIG. 2. Other embodiments will be described in a manner same as the above in which the second embodiment will be described.

In FIGS. 4 and 5, the key member 5a of the pad 5 is fixed to the contact pushing member 5b of the pad 5. This fixing is executed by a projection formed on the contact pushing member 5b being fitted in a corresponding concavity formed on the key member 5a. A plurality of spring portions 4c are formed so as to respectively project toward the center line L as shown in FIG. 5. The ditches 4d are formed in the dome portion 4b of the front housing 4 to give the spring portions 4c spaces to move. The front housing 4 is made of resin material. Thus, each of the spring portion 4c acts as a spring which applies a force to the key member 5a so as to push the key member 5a toward the center of the through hole 4a.

In this second embodiment, in addition to the advantages given in the first embodiment shown in FIGS. 2 and 3, the following advantages are given by the above-mentioned effect of the spring portion 4c. While the pad 5 tilts or rotates, for example, rotates according to the arrow $A_1$, the spring portion 4c teads to make the pad 5 return to the its neutral position shown in FIG. 4. This tilting or rotation occurs as a result of the operator pushes the key member 5a with his or her finger. This function of the spring portions 4c results in a resistance force being created, which resistance force acts against an operating force applied to the key member 5a by the operator's finger. This resistance force may be appropriately adjusted by adjusting the spring constant of the spring portions 4c. This adjustment may improve a "click feeling" such as mentioned above felt by the operator when the operator pushes the key member 5a. In this second embodiment, the pad 5 is returned to the its neutral position by the function of the spring portions 4c while the pad 5 is returned to the its neutral position by the effect of the function of the elastic member 3 in the first embodiment.

Figure 6:
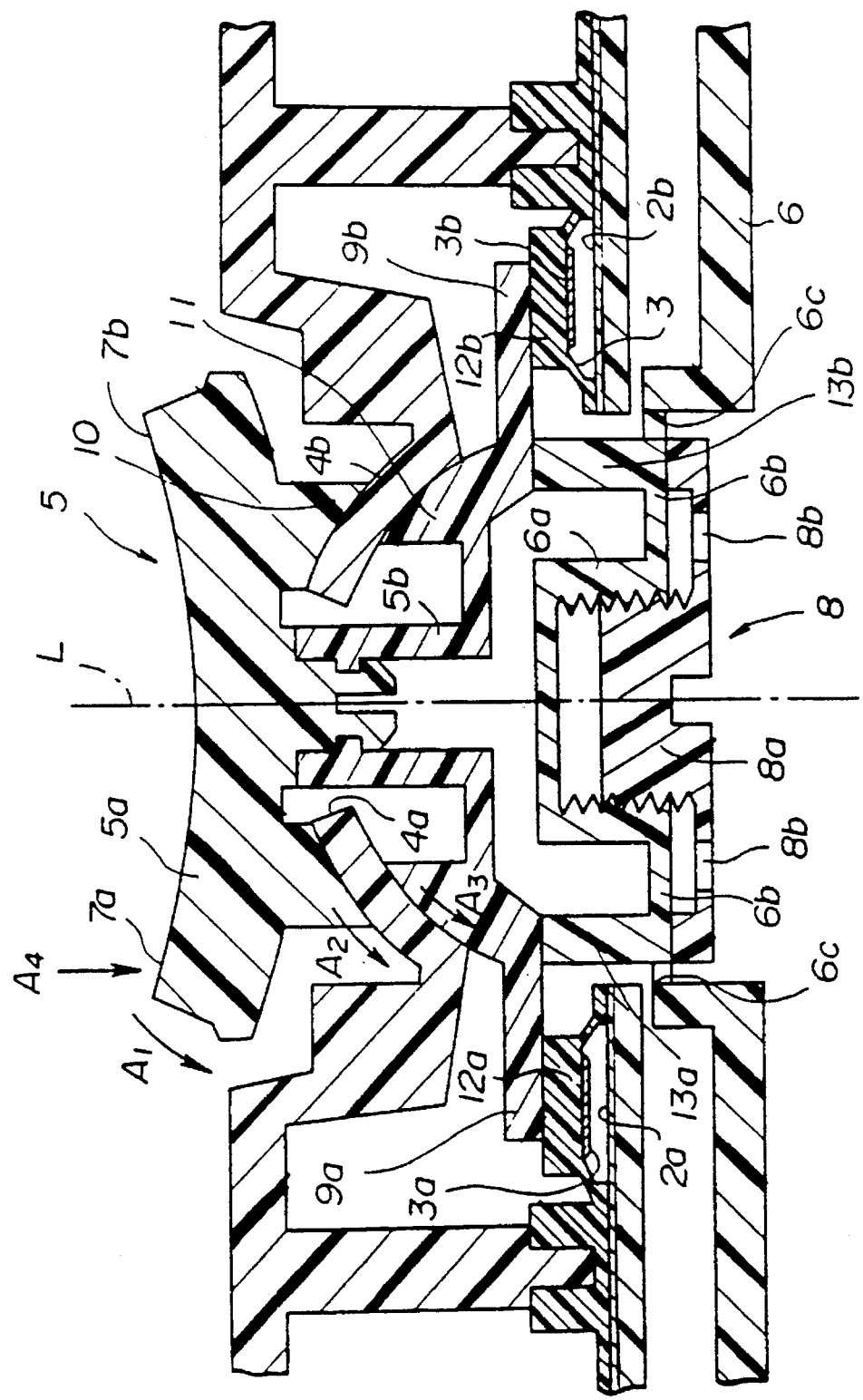
FIG. 6 shows a sectional view of a third embodiment of the control key device according to the present invention.
Figure 7:
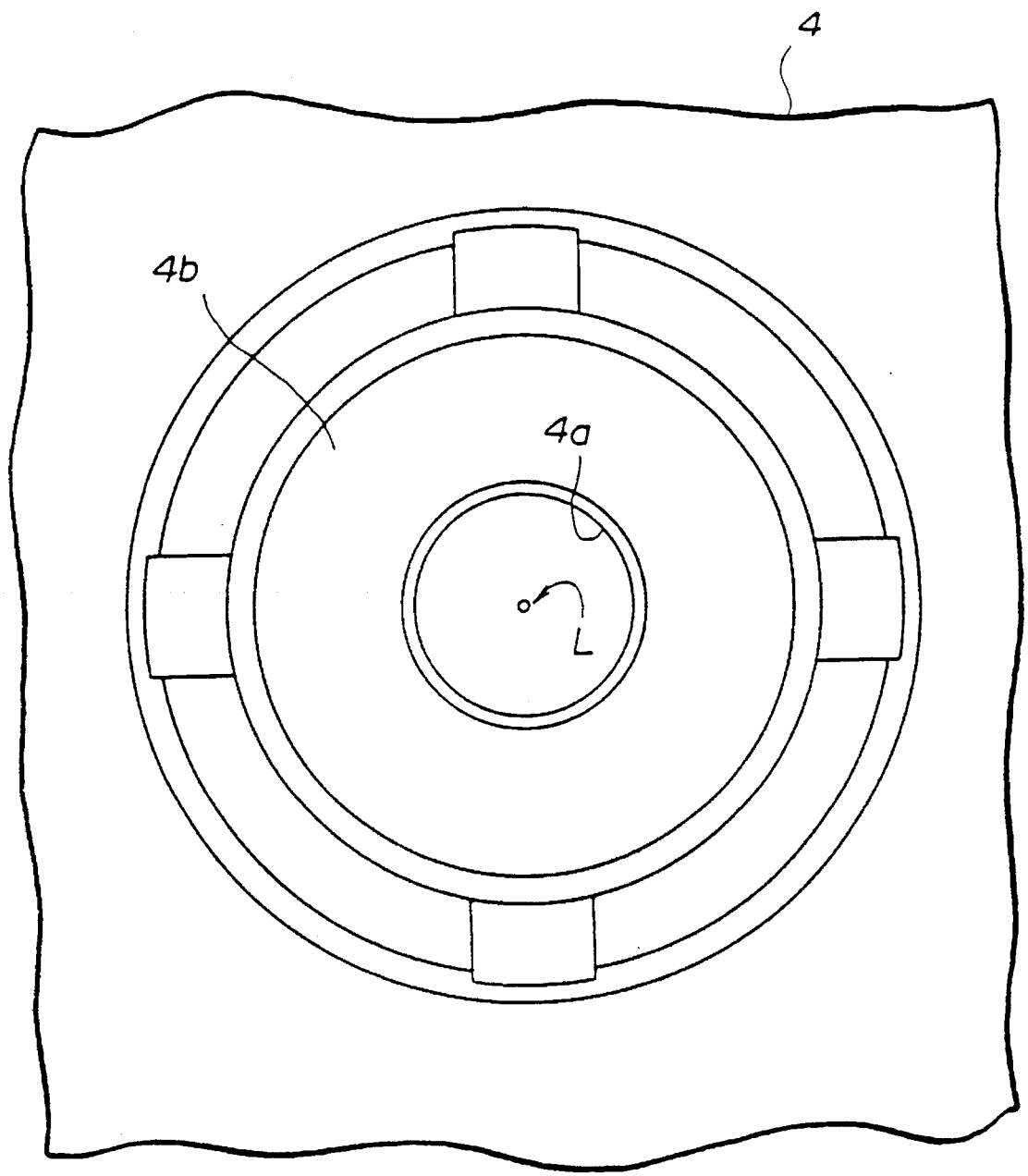
FIG. 7 shows plan view of a front housing of the third embodiment shown in FIG. 6.
Figure 8:
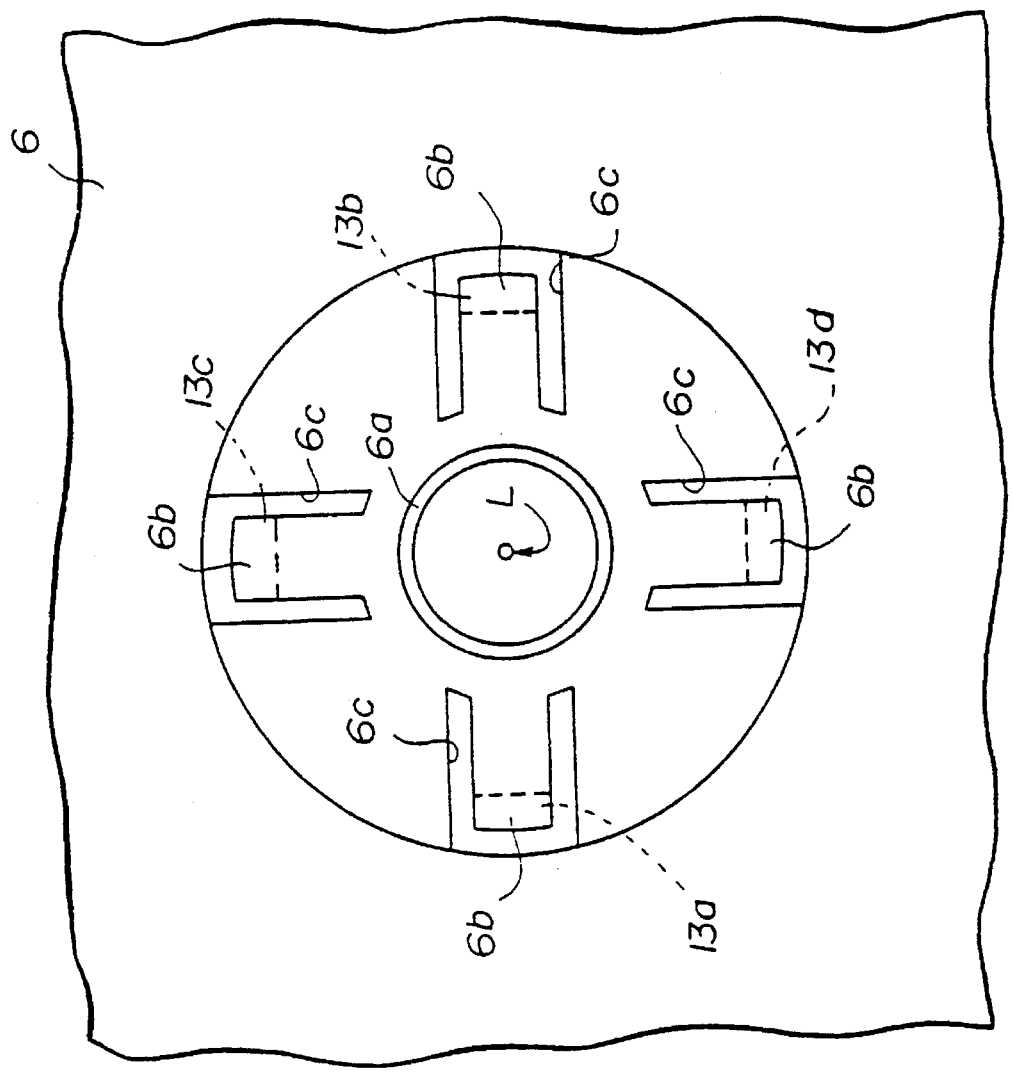
FIG. 8 shows a bottom view of a rear housing of the third embodiment shown in FIG. 6.

A third embodiment of the control key device according to the present invention will now be described with reference to FIGS. 6 to 8. In FIGS. 6 to 8, a female-screw portion 6a and four spring portions 6b are formed in the rear housing 6. The center of the female-screw portion 6a coincides with the center line L. As shown in FIG. 8, each of the spring portions 6b are arranged so as to align with the four projections 7a to 7d formed on the key member 5a shown in FIG. 3. The four spring portions 6b are respectively formed by removing corresponding four cutting-out portions 6c from the rear housing 6. Each of the four cutting-out portions 6c has a generally U-letter shape, as shown in FIG. 8. Thus, each of the spring portions 6b extends outward in a direction away from the center line L. The four spring portions 6b respectively have force bearing portions 13a, 13b, 13c and 13d. Each of the force bearing portions 13a to 13d extends upward in FIG. 6.

The rear housing is made of resin material. Thus, the four spring portions 6b act as springs for applying forces to the pad 5 so as to return the pad 5 to the its neutral position while the pad 5 is tilted or rotated, for example, rotated according to the arrow $A_1$. This function of the four spring portions 6b is effected with the force bearing portions 13a to 13d respectively bearing forces applied thereto downward in FIG. 6 via the contact pushing portion 5b. The forces are applied as a result of the operator pushing the key member 5a so as to tilt it.

A force adjustment member 8 is provided in the control key device shown in FIG. 6. A male screw portion 8a of this force adjustment member 8 is screwed in the female screw portion 6a. Four spring portions 8b are formed on the force adjustment member 8. Each of the four spring portions 8b may be in contact with the bottom, in FIG. 6, of a respective one of the four spring portions 6b.

Rotating of the force adjustment portion 8 with respect to the center line L causes the force adjustment portion 8 to move upward or downward in FIG. 6. This upward/downward movement of the force adjustment portion 8 occurs with the screw function effected between the female screw portion 6a of the rear housing 6 and the male screw portion 8a of the force adjustment portion 8. This upward/downward movement of the force adjustment portion 8 may adjust the force being applied to the four spring portions 6b by the four spring portions 8b. This adjustment is executed as follows. The upward movement of the force adjustment portion 8 increases the force being applied to the four spring portions 6b by the four spring portions 8b. On the other hand, the downward movement of the force adjustment portion 8 decreases the force being applied to the four spring portions 6b by the four spring portions 8b. The adjustment of the force being applied to the four spring portions 6b by the four spring portions 8b results in the adjustment of the above-mentioned force. The above-mentioned force effects to bear the downward force applied to the force bearing portions 13a to 13d by the contact pushing member 5b.

In addition to the advantages given in the first embodiment shown in FIGS. 2 and 3, the following advantages are given by the third embodiment shown in FIGS. 6 to 8. While the pad 5 tilts or rotates, for example, rotates according to the arrow $A_1$, the four spring portions 6b tend to make the pad 5 return to the its neutral position shown in FIG. 6. This tilting or rotation occurs as a result of the operator pushing the key member 5a with his or her finger. This function of the four spring portions 6b results in a resistance force being created, which resistance force acts against an operating force applied to the key member 5a by the operator's finger. This resistance force may be appropriately adjusted by adjusting the spring constant of the spring portions 6b. This adjustment may improve a "click feeling" such as mentioned above felt by the operator when the operator pushes the key member 5a.

Further, the adjustment of the above resistance force may also be performed by means of the force adjustment portion 8 by rotation thereof as mentioned above. This adjustment may be performed after the control key device has been already manufactured. On the other hand, the adjustment by means of varying the spring constants of the spring portions 6b may be performed only while the control key device is being manufactured. Thus, the adjustment by means of the adjustment portion 8 offers a "click feeling" optimum to a particular operator easily.

A fourth embodiment of the control key device according to the present invention will now be described with reference to FIG. 9.

Figure 9:
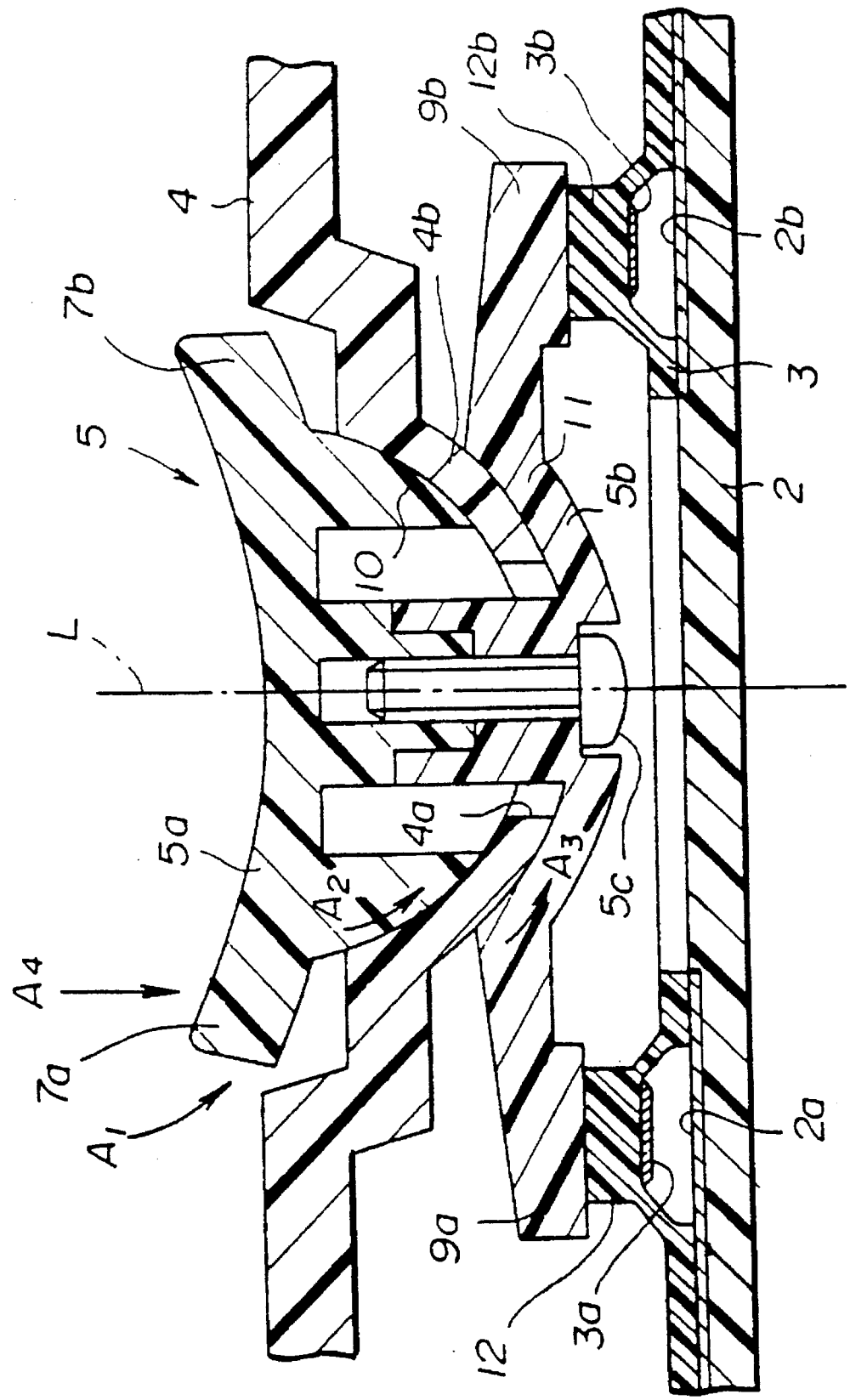
FIG. 9 shows a sectional view of a fourth embodiment of the control key device according to the present invention.

In FIG. 9, the dome portion 4b formed in the front housing 4 has a half-sphere shape and the convex surface of the half-sphere shape faces toward the substrate 2. The sliding portion 10 formed on the key member 5a is in contact with the inside (the top in FIG. 9) surface of the dome portion 4b while the sliding portion 11 of the contact pushing portion 5b is in contact with the outside (the bottom in FIG. 9) surface of the dome portion 4b.

This fourth embodiment has been obtained as a result of modifying the first embodiment shown in FIGS. 2 and 3. This modification is such that the half-sphere shape of the dome portion 4b is reversed between the top and bottom. That is, the top of the half-sphere shape in the first embodiment becomes the bottom of the half-sphere shape in the fourth embodiment. However, the fourth embodiment shown in FIG. 9 offers the same advantages as those offered by the first embodiment shown in FIGS. 2 and 3.

Further, in the above first to fourth embodiments of the control key devices according to the present invention, methods for fixing the key member 5a to the contact pushing member 5b comprise the method by means of the screw and the method by fitting the projection to the corresponding concavity. However, the method for fixing the key member 5a to the contact pushing member 5b is not limited to the above-mentioned methods. Any other known method may be employed for this purpose.

Summarizing the above, the control key devices according to the present invention offer the following advantages. Electrical contact may be established in the desired electrical contact portion. This electrical contact establishment may be realized without requiring the pad 5 to come directly in contact with the substrate 4. Thus, even if a strong shock is applied to the top of the pad 5 downward, the strong shock is prevented from being directly transmitted to the substrate 2. Thus, damage occurring in the wiring itself or wiring connections may be prevented.

The resistance force may be appropriately adjusted, which force makes the pad 5 return to the its neutral position by the spring effect. This adjustment may improve a "click feeling", such as mentioned above, felt by the operator when the operator pushes the key member 5a.

Further, the other adjustment may be performed by adjusting the above-mentioned spring effect even after the control key device has been already manufactured. Thus, this adjustment offers a "click feeling" optimum to a particular operator easily by varying the spring effect appropriately so as to fulfill the operator's request.

The control key device of the type described heretofore includes a resilient member has four bulges with an electrically conductive portions, a contact pressing member having a spherical surface and four legs resting on the four bulges of the resilient member, a curved portion of a casing having a bottom surface making contact with the spherical surface of the contact pressing member, and a key fixed to the contact pressing member via an opening in the curved portion. A bottom surface of this key makes contact with a top surface of the curved portion.

When the key is tilted in one direction from a home position, the bottom surface of the key slides on the top surface of the curved portion, and the spherical surface of the contact pressing member slides with respect to the bottom surface of the curved portion. As a result, one of the legs pushes a corresponding bulge of the resilient member, and the electrically conductive portion of this bulge makes electrical contract with an electrical contact.

Because the spherical surface of the contact pressing member slides against the bottom surface of the curved portion of the casing, the spherical surface of the contact pressing member may stick to the bottom surface of the curved portion depending on the friction between the two surfaces. This sticking phenomenon may occur particularly when the spherical surface of the contact pressing member hits against an edge of the bottom surface of the curved portion and gets caught by the edge. When such a sticking occurs, the key will be locked to the tilted position, and the operator would have to forcibly return the key to the home position because the key will not return to the home position by itself.

Figure 10:
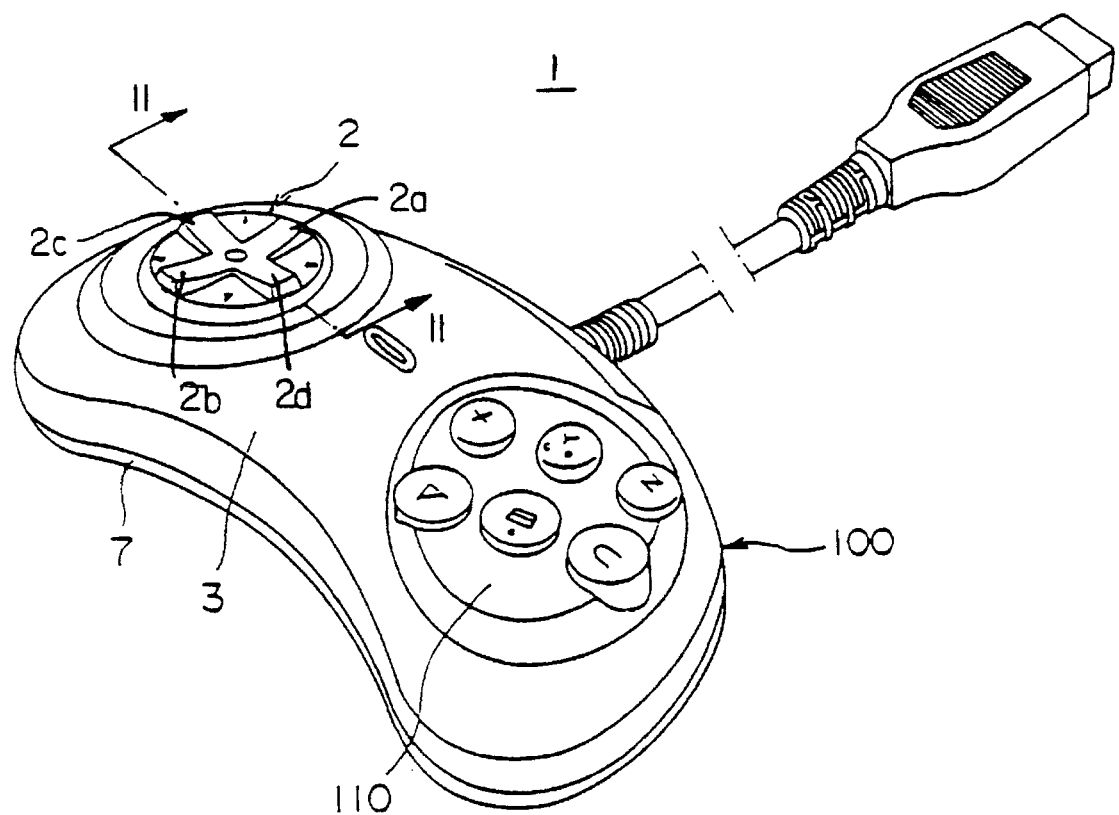
FIG. 10 is a perspective view showing an embodiment of the external appearance of a control key device according to the present invention.

FIG. 10 is a perspective view showing an embodiment of the external appearance of a control key device according to the present invention. As shown in FIG. 10, a control key device 1 generally includes a key 2, a casing 100 and a plurality of buttons 110. The casing 100 is made up of upper and lower halves 3 and 7. The key 2 is provided with projections 2a through 2d at which a manipulating force is applied by an operator. For example, the key 2 tilts in response to the manipulating force applied to one of the projections 2a through 2d to specify a moving direction of a displayed character or the like on a video game apparatus or a portable electronic game apparatus. The buttons 110 are manipulated to control various functions modes of the video or electronic game.

Figure 11:
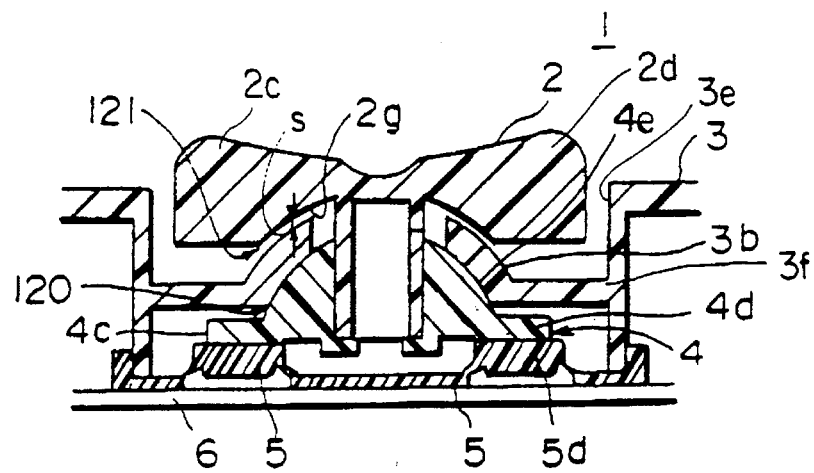
FIG. 11 is a cross sectional view showing a fifth embodiment of the control key device according to the present invention.
Figure 12:
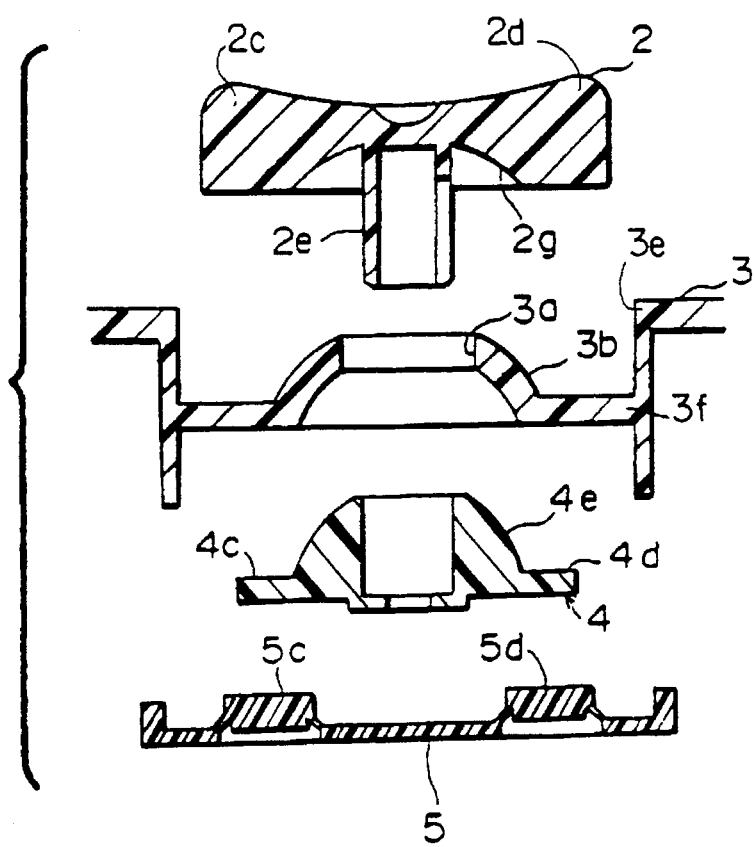
FIG. 12 is a cross sectional view showing the fifth embodiment in a disassembled state.

FIG. 11 is a cross sectional view showing a fifth embodiment of the control key device according to the present invention, and FIG. 12 is a cross sectional view showing the fifth embodiment in a disassembled state.

As shown in FIGS. 11 and 12, the key portion of the control key device 1 generally includes the key 2, a dome-shaped portion 3b of the upper half 3, a contact pressing member 4, and a resilient member 5, and a wiring board (or substrate) 6. A stem portion 2e of the key 2 is secured on the contact pressing member 4 via a hole 3a in the dome-shaped portion 3b of the upper half 3. The upper half 3 has a cavity 3e and the dome-shaped portion 3b is supported by a flat bottom portion 3f which extends from the side wall that defines the cavity 3e of the upper half 3. The flat bottom portion 3f suspends the dome-shaped portion 3b spaced from the substrate 6 and an extra force applied to the key 2 by an operator is prevented from reaching the substrate 6.

In a home position of the key 2 shown in FIG. 11, a bottom surface 2g of the key 2 is spaced apart from top surface of the dome-shaped portion 3b. In addition, a bottom surface of the dome-shaped portion 3b makes contact with a spherical surface portion 4e of the contact pressing member 4.

Figure 19:
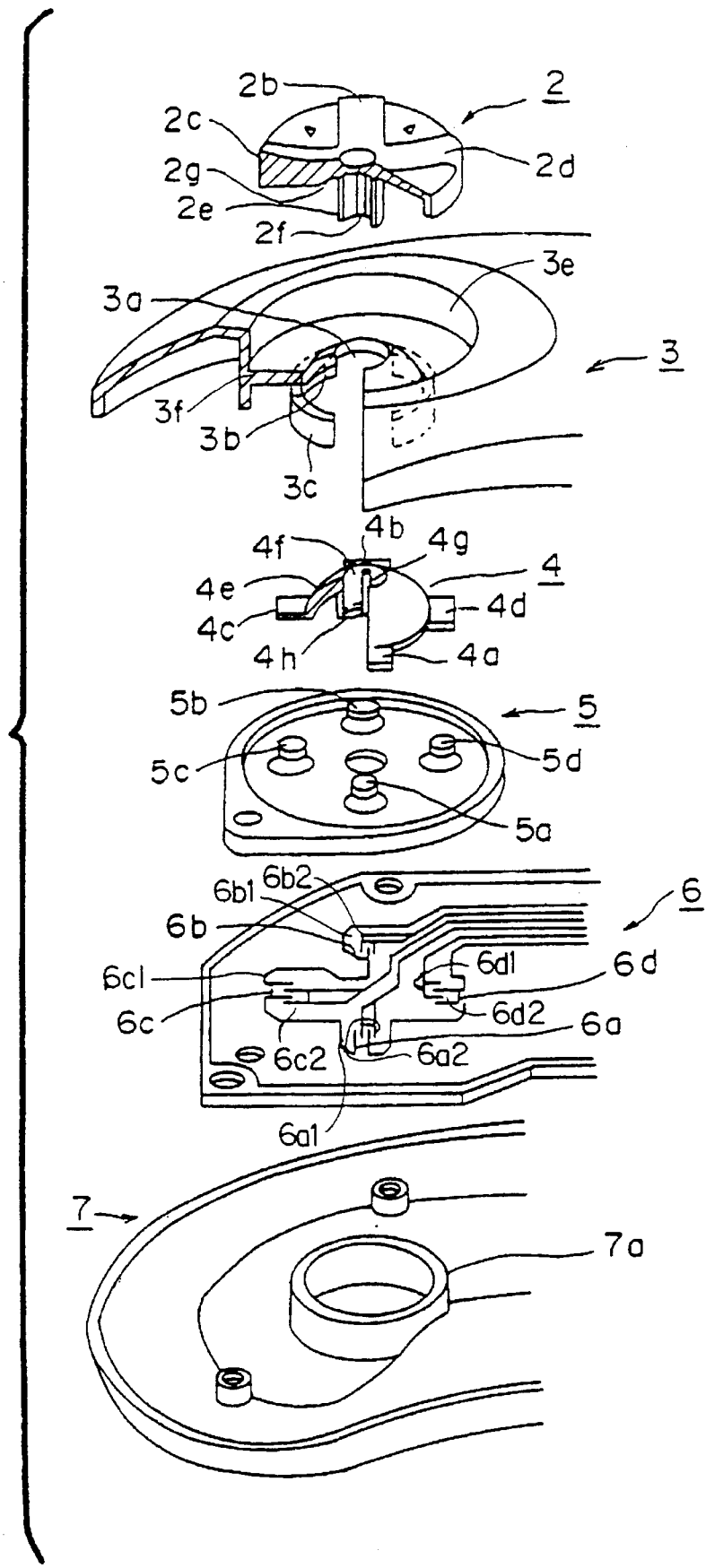
FIG. 19 is a perspective view showing the ninth embodiment in a disassembled state.
Figure 22:
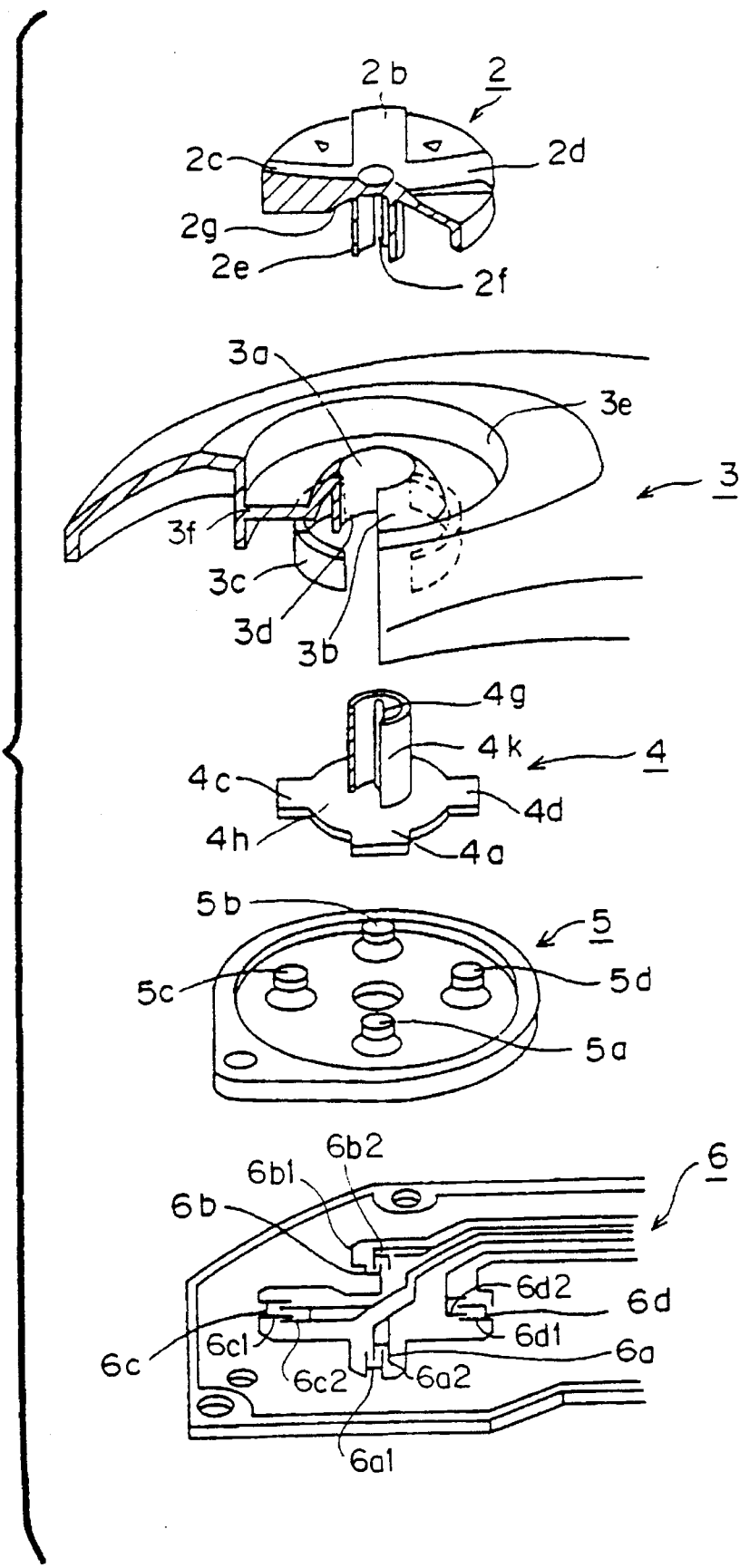
FIG. 22 is a perspective view showing the tenth embodiment in a disassembled state.
Figure 23A:
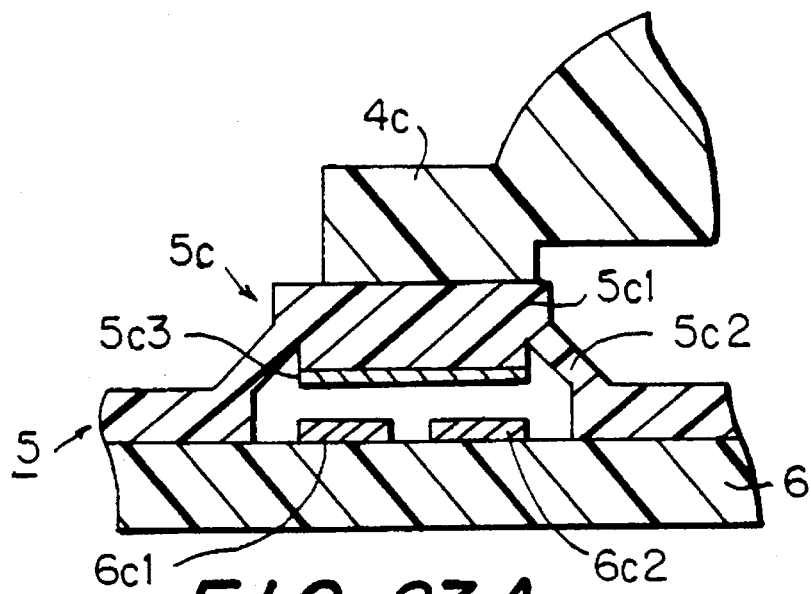
FIG. 23A and 23B respectively are cross sectional views for explaining the switch action of the control key device.

Furthermore, in the home position of the key 2, legs 4a through 4d (only 4c and 4d shown in FIGS. 11 and 12) of the contact pressing member 4 rests on corresponding bulges 5a through 5d (only 5c and 5d shown in FIGS. 11 and 12) of the resilient member 5 so that there exists a gap s between the spherical bottom surface 2g and the top surface of the dome-shaped portion 3b. An electrically conductive portion is provided at least on a bottom of each of the bulge 5a through 5d, For example, as shown in FIG. 23A, the bulge 5c consists of a top portion 5c1 of a disk shape, a conductive portion 5c3 provided on the bottom of the top portion 5c1 and a skirt portion 5c2 of a truncated cone shape which movably supports the top portion 5c1. On the substrate 6 there are provided a pair of contacts or electrodes 6c1 and 6c2. The conductive portion 5c3 constitutes a movable switch with the electrodes 6c1 and 6c2. Each of the bulges 5a through 5d has the same or similar structure and constitute a switch with the electrode under the conductive portion. The arrangement of electrodes 6a1, 6a2 through 6d1, 6d2 is depicted in FIGS. 19 and 22. The electrically conductive portion does not make electrical contact with a corresponding pair of electrical contacts of the wiring board 6 in the home position of the key 2 shown in FIG. 11.

Figure 13:
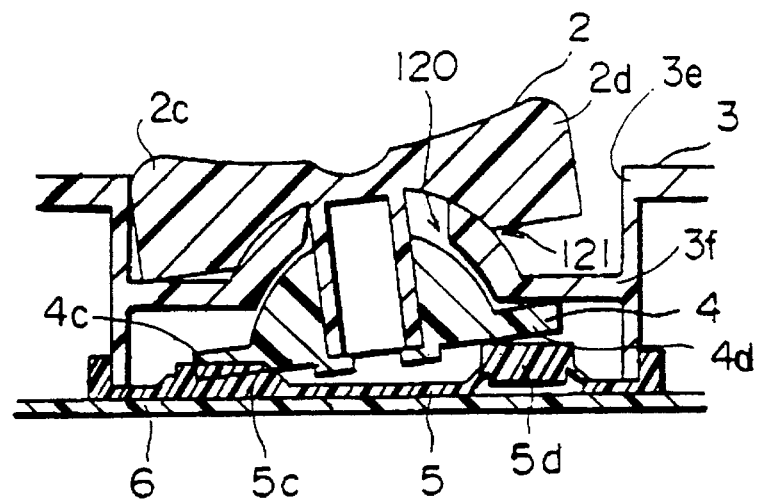
FIG. 13 is a cross sectional view showing the fifth embodiment in a state where a key is tilted from a home position.
Figure 23B:
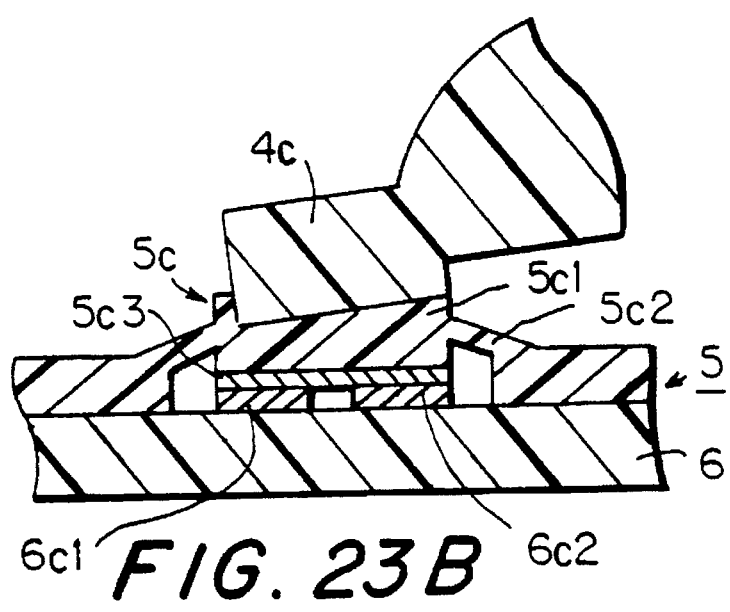

When the operator pushes down on the projection 2c, for example, the key 2 tilts from the home position and the leg 4c of the contact pressing member 4 presses the corresponding bulge 5c in FIG. 13 For example, as shown in FIG. 23B this electrically conductive portion 5c3 makes electrical contact with the corresponding electrodes 6c1 and 6c2 of the wiring board 6. As a result, an electrical circuit (not shown) detects the tilted direction of the key 2 based on the contact at the electrodes 6c1 and 6c2.

When the operator lets go of the tilted key 2 in FIG. 13, the key 2 returns to the home position shown in FIG. 11 by itself due to the resilient force of the resilient member of the skirt portion 5c2 at the bulge 5c.

When the key 2 is pushed at its top surface, the key 2 moves down to decrease the gap s so that the bottom surface 2g of the key 2 contacts the top surface of the dome-shaped portion 3b. When the forces applied, for example, to the projections 2c and 2d are equal in strength, the dome-shaped portion 3b acts as a stopper for preventing the key 2 from going down further. Thus, the key 2 is kept level, and it is possible to prevent an erroneous operation in which the switches at the bulges 5c and 5d are closed simultaneously. When the force applied to one of the projections 2a through 2d are stronger than the forces applied to the other projections, the key 2 tilts from the home position shown in FIG. 11 to the tilted position shown in FIG. 13, while the bottom surface 2g of the key 2 slides on the top surface of the dome-shaped portion 3b, and the spherical surface portion 4e of the contact pressing member 4 leaves the bottom surface of the dome-shaped portion 3b. The bottom surface 2g and the top surface of the dome-shaped portion 3b respectively have mating spherical surfaces and accordingly the key 2 moves smoothly on the dome-shaped portion 3b when the key 2 receives a pressinge pressing force at the top surface. On the other hand, the contact pressing member 4 tilts while its top surface is spaced apart from the bottom surface of the dome-shaped portion 3b, which reduces the friction between the contact pressing member 4 and the dome-shaped portion 3b.

The movement of the key 2 of going down by the force applied at the top surface of the key 2 leads the bulges 5a through 5d to move down closer to the electrodes 6a1, 6a2 through 6d1 on the substrate (printed circuit board) 6 by the gap s between the key 2 and the dome-shaped portion 3b and the key 2 tilts along the top surface of the dome-shaped portion 3b. These movements require less tilting movement to make the conductive portion 5c3 in contact with the corresponding electrode than in the configuration as in the embodiments shown in FIGS. 2 through 9 wherein no gap is provided between the bottom surface of the key 2 and the top surface of the dome-shaped portion 3b.

Then, the operator releases the pushing force, the bottom surface 2g of the key 2 comes off the top surface of the dome-shaped portion 3b and the spherical surface portion 4e of the contact pressing member 4 contacts and slides against the inner spherical surface of the dome-shaped portion 3b when the key 2 returns from the tilted position to the home position. Thus, the light and smooth touch in the manipulation of the key 2 is obtained.

However, the friction between the spherical surface portion 4e and the bottom surface of the dome-shaped portion 3b, there is a possibility of the key 2 sticking at the tilted position or an intermediate position between the tilted position and the home position.

For this reason, it is conceivable to increase the resilient force exerted by the resilient member 5. However, this would require more force to tilt the key 2 from the home position to the tilted position, and the light and smooth touch (so-called feather touch) key operation becomes hindered to make and a quick operation of the key 2 becomes difficult.

On the other hand, in order to increase the resilient force of the resilient member 5, it is conceivable to increase the gap between the electrically conductive portions of the bulges 5a through 5d and the wiring board 6 in the home position of the key 2. But in this latter case, it would require the key 2 to be tilted with a larger stroke in order to achieve the electrical contact between the electrically conductive portion and the corresponding electrodes contact of the wiring board 6. As a result, the light and smooth touch key operation becomes hundered to make, and it becomes impossible to make a quick key operation. Furthermore, the need to tilt the key 2 with the large stroke would require more space to provide the key 2 on the control key device 1.

Figure 14:
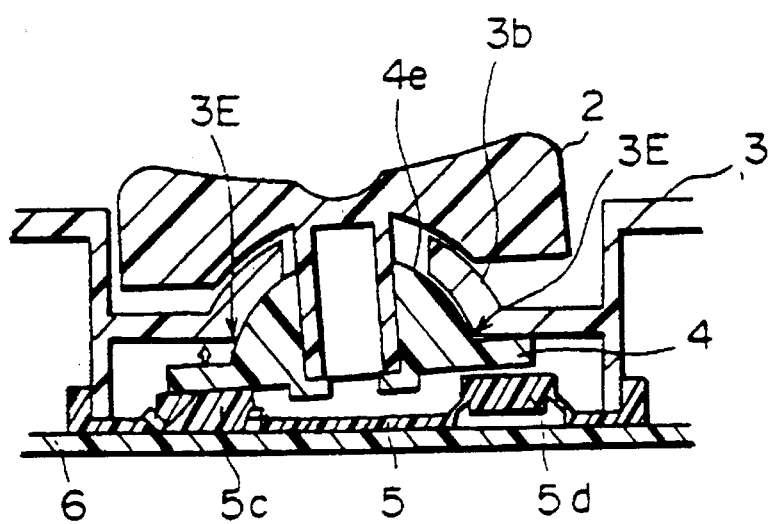
FIG. 14 is a cross sectional view for explaining sticking of the key at the tilted position.

In addition, the above described sticking of the key 2 may occur particularly when the spherical surface portion 4e of the contact pressing member 4 pushes against an edge 3E at the bottom part of the dome-shaped portion 3b as shown in FIG. 14. In order to guarantee the restoration of the pressed bulges 5a through 5d, it is in general necessary to provide a gap of approximately 1 mm between the electrically conductive portion of the bulge and the wiring board 6 in the home position of the key 2. For this reason, there is a limit to reduce the pushing force of the spherical surface portion 4e acting on the edge 3E. In other words, the restoration of the bulges 5a through 5d and thus the automatic return of the tilted key 2 to the home position may not be guaranteed if the resilient force exerted by the resilient member 5 is too weak, but if the resilient force exerted by the resilient member 5 is too strong, the possibility of the spherical surface portion 4e becoming caught by the edge 3E increases.

In fifth embodiment of the control key device of the present invention, a lubricant film 120 is provided at least between the spherical surface portion 4e and the bottom surface of the dome-shaped portion 3b. For example, a grease or the like may be used as the lubricant. In addition, it is also possible to provide a lubricant film 121 between the bottom surface 2g of the key 2 and the top surface of the dome-shaped portion 3b. The lubricant films 120 and 121 may be coated on either of the two surfaces which relatively slide with respect to one another, for example.

According to the fifth embodiment with the lubricant, it is possible to prevent sticking of the key 2 at the tilted position or the intermediate position between the tilted position and the home position. In addition, it is possible to maintain the light and smooth touch key operation and to make the quick operation of the key 2.

As a modification of the fifth embodiment with the lubricant, it is possible to use a material which has a lubricative surface for the key 2, the dome-shaped portion 3b, and the spherical portion 4e. According to this modification, it becomes unnecessary to provide the lubricant film.

The characteristic of the lubricant may deteriorate with time, and it may be difficult to maintain a uniform lubricant film without maintenance of the control key device. Hence, a description will now be given of embodiments of the control key device according to the present invention which can eliminate such possible problems of the fifth embodiment.

Figure 15:
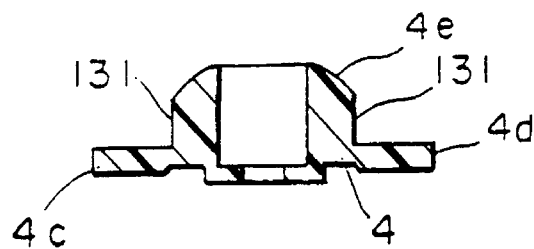
FIG. 15 is a cross sectional view showing an important part of a sixth embodiment of the control key device according to the present invention.

FIG. 15 is a cross sectional view showing an important part of a sixth embodiment of the control key device according to the present invention. More particularly, FIG. 15 shows the contact pressing member 4.

In this sixth embodiment, a cutout portion 131 is provided at the lower part of the spherical surface portion 4e corresponding to the position of the edge 3E of the dome-shaped portion 3b shown in FIG. 14.

According to this sixth embodiment, the edge 3E of the dome-shaped portion 3b is prevented from catching the spherical surface portion 4e of the contact pressing member 4 because of the provision of the cutout portion 131. As a result, it is always possible to prevent sticking of the key 2 at the tilted position or the intermediate position between the tilted position and the home position. In addition, the light and smooth touch key operation can be maintained, and it is possible to make the quick operation of the key 2.

Figure 16:
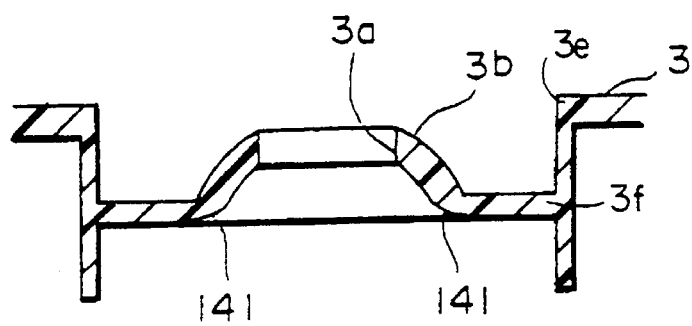
FIG. 16 is a cross sectional view showing an important part of a seventh embodiment of the control key device according to the present invention.

FIG. 16 is a cross sectional view showing an important part of a seventh embodiment of the control key device according to the present invention. More particularly, FIG. 16 shows the dome-shaped portion 3b of the upper half 3.

In this seventh embodiment, a rounded portion 141 is provided at a position corresponding to the edge 3E shown in FIG. 14. A radius of curvature of this rounded portion 141 is greater than that of the remaining bottom surface part of the dome-shaped portion 3b. As a result, it is always possible to prevent sticking of the key 2 at the tilted position or the intermediate position between the tilted position and the home position. In addition, the light and smooth touch key operation can be maintained, and it is possible to make the quick operation of the key 2.

Figure 17:
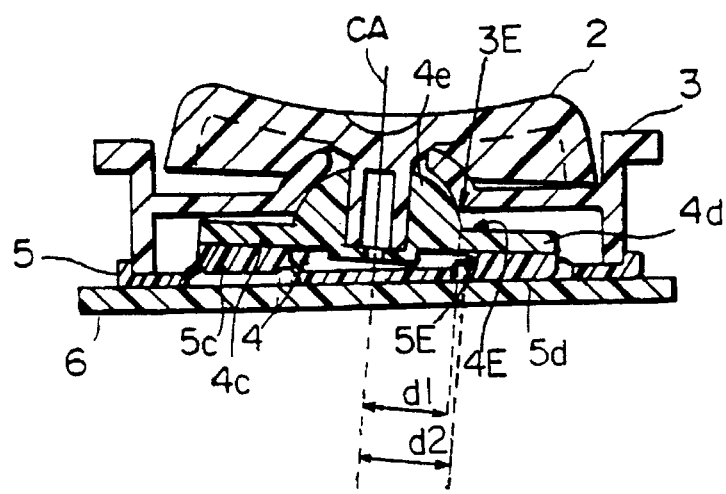
FIG. 17 is a cross sectional view showing an eighth embodiment of the control key device according to the present invention.

FIG. 17 is a cross sectional view showing an eighth embodiment of the control key device according to the present invention. In FIG. 17, those parts which are the same as those corresponding parts in FIGS. 10 through 14 are designated by the same reference numerals, and a description thereof will be omitted. FIG. 17 shows the eighth embodiment in the tilted position of the key 2.

In this eighth embodiment, a maximum horizontal distance d1 between a center axis CA of the key 2 and the bottom surface of the spherical line portion 4e (corner line 4E at which the spherical surface portion 4e meets the legs 4a through 4d) is set smaller than a horizontal distance d2 between the center axis CA and an inner edge 5E of each of the top portions of the bulges 5a through 5d of the resilient member 5. The distance d1 is essentially the horizontal distance between the center axis CA and the edge 3E. As a result, the resilient force exerted by the bulge 5d acts at a position further away from the edge 3E relative to the center axis CA when compared to the case shown in FIG. 14, and it is possible to more smoothly return the key 2 to the home position due to the leverage function.

However, as described above, the distance between the electrically conductive portion of the bulge and the corresponding electrical contacts of the wiring board in the normal state where the key is at the home position must be set to a predetermined value in order to avoid erroneous contact and to guarantee the return of the bulge to the normal state after being pushed by the leg of the contact pressing member. For this reason, it is necessary to tilt the key a predetermined amount in order to achieve the electrical contact between the electrically conductive portion of the bulge and the electrical contact. As a result, there is a limit to reduce the stroke distance of the key, and depending on this stroke distance, it may take time to realize the electrical contact described above and the response characteristic of the control key device may become poor.

On the other hand, to enable a large stroke of the key when tilting the key, it becomes necessary to provide large spaces between the wall defining the hold 3a and the stem portion 2e as shown in FIGS. 11 and 12 and between the key 2 and the surrounding wall of the casing 3 surrounding the key 2. As a result, the size of the control key device 1 is required to be larger. In addition, the provision of the sufficiently large space around the key may easily allow dust particles or the like to enter within the control key device, and the operator's finger tip may be pinched in the large space between the key 2 and the surrounding wall.

Next, a description will be given of embodiments of the control key device according to the present invention which can realize quick electrical contact and realize satisfactory response characteristic.

Figure 18:
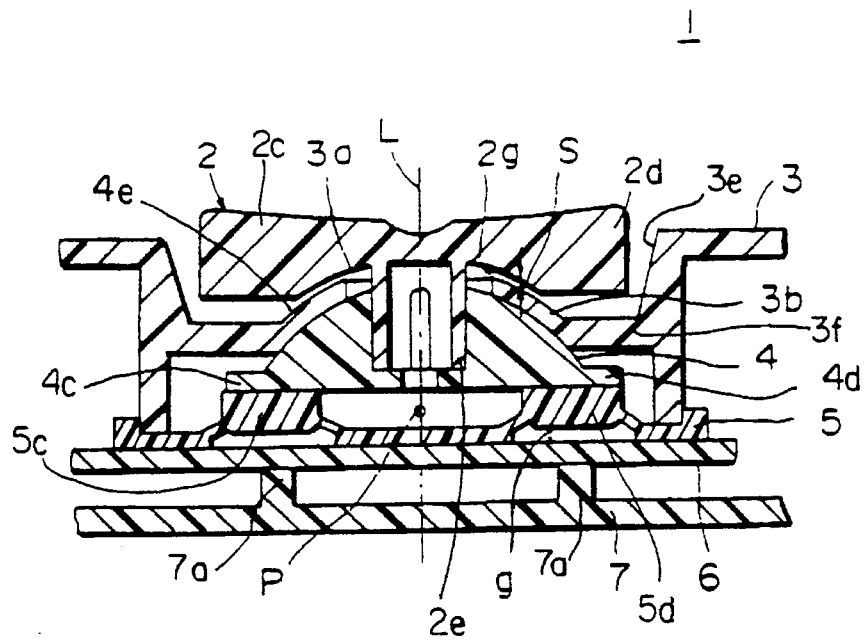
FIG. 18 is a cross sectional view showing a ninth embodiment of the control key device according to the present invention.
Figure 20:
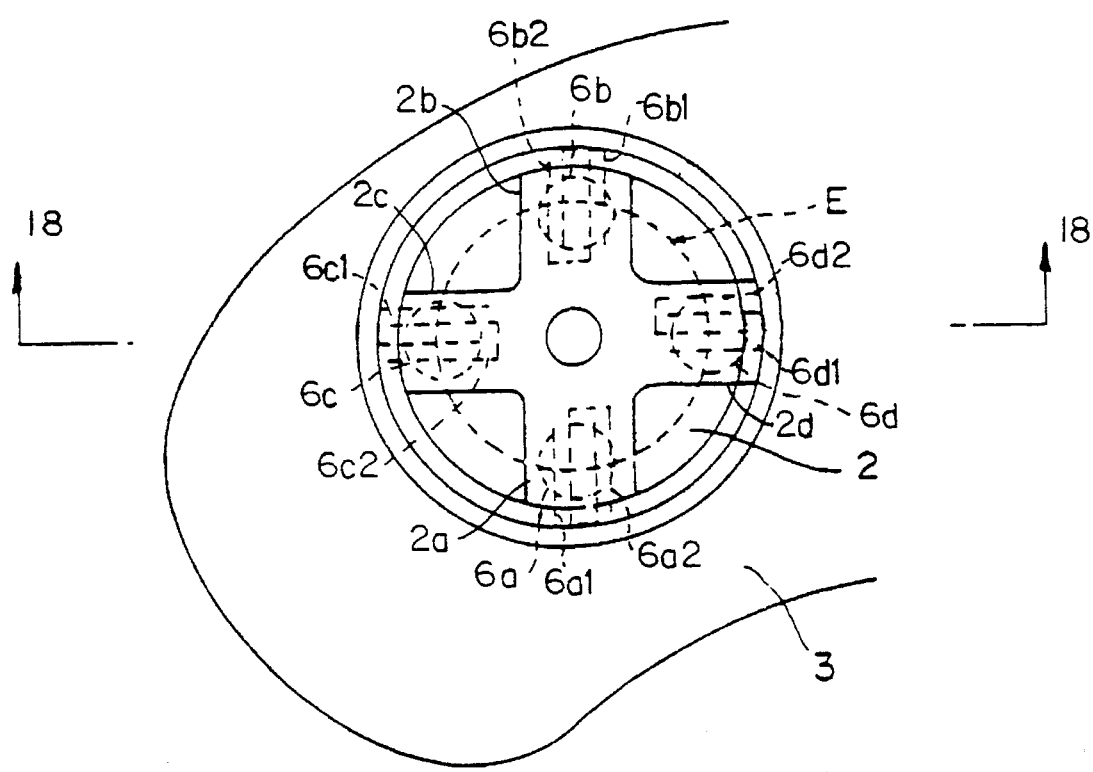
FIG. 20 is a plan view showing the ninth embodiment.

FIG. 18 is a cross sectional view showing a ninth embodiment of the control key device according to the present invention, and FIG. 19 shows a perspective view of the ninth embodiment in a disassembled state. In addition, FIG. 20 is a plan view showing the ninth embodiment. In FIGS. 18 through 20, those parts which are the same as those corresponding parts in FIGS. 10 through 14 are designated by the same reference numerals.

The control key device 1 shown in FIGS. 18 through 11 generally includes the key 2, the upper half 3 of the casing 100, a contact pressing member 4, the resilient member 5, the wiring board 6, and the lower half 7 of the casing 100. For example, the key 2 may be made of a nylon resin, the upper and lower halves 3 and 7 may be made of an ABS resin, and the contact pressing member 4 may be made of a polyacetal resin.

As shown in FIGS. 19 and 20, a pair of electrical contacts 6a and 6b and a pair of electrical contacts 6c and 6d are symmetrically arranged on a circumference E of the wiring board 6. Each of the electrical contacts 6a through 6d have a pair of electrodes (6a1 and 6a2, 6b1 and 6b2, 6c1 and 6c2, and 6d1 and 6d2, respectively) and constitute an electrical switch with the corresponding movable conductive layer (5a3, 5b3, 5c3 or 5d3) as shown in FIGS. 23A and 23B. In addition, as shown in FIG. 18, the upper half 3 and the lower half 7 are connected by screws (not shown), for example, and the key portion is generally held within the casing 100. A ring-shaped wall 7a is provided on the lower half 7 at a position corresponding to the electrical contacts 6a through 6d of the wiring board 6 as shown in FIG. 19. Hence, the ring-shaped wall 7a supports the wiring board 6 immediately below the electrical contacts 6a through 6d in the assembled state of the control key device 1.

Extra forces applied by an operator during playing games would be transmitted to the substrate 6 through the control key 4, the contact pressing member 4, and the depressed resilient bulges 5a through 5d and would make the substrate 6 bend or vibrate, thereby causing erroneous switching operations. However such erroneous switching operations are prevented by the supporting ring 7a.

The bulges 5a through 5d of the resilient member 5 are arranged at positions above the corresponding electrical contacts 6a through 6d on the wiring board 6. An electrically conductive portion is provided at least on a bottom of each of the bulges 5a through 5d. Hence, when the key 2 is tilted from the home position and the bulge 5c is pressed from the top and resiliently deformed, for example, the electrically conductive portion of this bulge 5a makes electrical contact with the corresponding electrical contact 6c on the wiring board 6. Hence, and electric circuit (not shown) detects the tilted direction of the key 2 based on the contact at the electrical contact. As shown in FIG. 18, a gap g exists between the electrical contacts 6a through 6d and the corresponding electrically conductive portions of the bulges 5a through 5d. For example, this gap g is set to 1 mm.

For example, the electrical circuit for detecting the tilted direction of the key 2 based on the electrical contact between the corresponding electrical contact and the electrically conductive portion of the bulge is described in a Japanese Laid-Open Utility Model Application No. 4-42029.

The upper half 3 generally covers the surface of the wiring board 6. The upper half 3 has a cavity 3e with the dome-shaped portion 3b and the hole 3a in this dome-shaped portion 3b. This hole 3a is concentric to the circumference E described above, and shares a center line L shown in FIG. 18. A center P of curvature of the top surface (outer surface) of the dome-shaped portion 3b is located approximately at the center of the vertical height position of the electrically conductive portions of the bulges 5a through 5d.

The key 2 has a generally mushroom shape, that is, an approximate T-shaped cross section. A disk portion of the key 2 is exposed at the cavity 3e of the upper half 3, and projections 2a through 2d forming a cross are provided on the top surface of the disk portion. In addition, a hollow cylindrical stem portion 2e extends downwards from the disk portion of the key 2. A cutout 2f which extends vertically is provided on the inner surface of the stem portion 2e. Furthermore, a sliding surface 2g is provided on the bottom of the disk portion of the key 2. This sliding surface 2g makes sliding contact with the top surface of the dome-shaped portion 3b when a pressing force is applied to the key 2 by an operator. For example, the sliding surface 2g may be formed by a curved surface corresponding to the top surface of the dome-shaped portion 3b or, by projections which form a cross in correspondence with the top surface of the dome-shaped portion 3b. In the latter case, the projections on the bottom of the disk portion of the key 2 are provided at positions corresponding to the projections 2a through 2d, for example.

The contact pressing member 4 includes the legs 4a through 4d having horizontal bottom surfaces which make contact with the corresponding bulges 5a through 5d of the resilient member 5, and the spherical surface portion 4e which makes contact with the bottom surface (inner surface) of the dome-shaped portion 3b. A circular hole 4f is formed in the contact pressing member 4 from the top central part of the spherical surface portion 4e towards the bottom surface of the contact pressing member 4. The stem portion 2e of the key 2 fits into this hole 4f. The hole 4f is provided with a projection 4g which fits into the cutout 2f when the stem portion 2e is fitted into the hole 4f. Hence, it is possible to fix the rotational position and the vertical position of the key 2 relative to the contact pressing member 4.

The ring-shaped wall 3c extends downwardly from the outer periphery of the dome-shaped portion 3b, and this ring-shaped wall 3c has 4 cutouts corresponding to the positions of the legs 4a through 4d. Hence, in the assembled state of the control key device 1, tips of the legs 4a through 4d project via the corresponding cutouts in the ring-shaped wall 3c. The legs 4a through 4d of the contact pressing member 4 can push against the corresponding bulges 5a through 5d of the resilient member 5, so as to achieve electrical contact between the electrically conductive portions of the bulges 5a through 5d and the corresponding electrical contacts 6a through 6d on the wiring board 6.

The projections 2a through 2d which form a cross on the top of the key 2 are arranged to correspond to the electrical contacts 6a through 6d of the wiring board 6. The key 2 is connected to the contact pressing member 4 by inserting the stem portion 2e into the hole 4f of the contact pressing member 4 via the hole 3a in the dome-shaped portion 3b. In the connected state, the tip end of the stem portion 2e makes contact with a surface 4h at the bottom of the hole 4f, and the projection 4g fits into the cutout 2f. The diameter of the hole 3a is greater than the diameter of the stem portion 2e so that the key 2 is free to tilt in all directions.

In the home position of the key 2 shown in FIG. 18, a gap s is formed between the bottom surface 2g of the key 2 and the top surface of the dome-shaped portion 3b. For example, this gap s is set in a range of 0.3 mm to 0.5 mm. In addition, the legs 4a through 4d of the contact pressing member 4 rest on the corresponding bulges 5a through 5d of the resilient member 5, and the spherical surface portion 4e of the contact pressing member 4 makes movable contact with the bottom surface of the dome-shaped portion 3b.

When the operator gently places his finger on the key 2, the legs 4a through 4d of the contact pressing member 4 are displaced downwards against the resilient force exerted by the resilient member 5. As a result, the bottom surface 2g of the key 2 movably contacts the top surface of the dome-shaped portion 3b. In this standby state of the key, the bottom surface 2g of the key 2 can slide relative to the top surface of the dome-shaped portion 3b. In addition, the legs 4a through 4d of the contact pressing member 4 uniformly press the bulges 5a through 5d of the resilient member 5, but the vertical displacement is such that the electrically conductive portions of the bulges 5a through 5d will not make electrical contact with the electrical contacts 6a through 6d of the wiring board 6.

The above described vertical displacement of the key 2 amounts to the distance corresponding to the gap s. Even if the electrically conductive portions of the bulges 5a through 5d are displaced downwards by the distance corresponding to the gap s, the electrically conductive portions will not make electrical contact with the electrical contacts 6a through 6d because the gap g is set greater than the gap s.

When the operator wishes to tilt the key 2 from the standby state so that the electrical contact is achieved between the electrically conductive portion of the bulge 5c and the electrical contact 6c, the operator pushes the projection 2c of the key 2 by his finger with a force of 70 g to 80 g, for example. In response to this pushing force applied on the key 2, the bottom surface 2g of the key 2 slides on the top surface of the dome-shaped portion 3b and the contact pressing member 4 tilts. As a result, the leg 4c of the contact pressing member 4 presses against the bulge 5c of the resilient member 5.

The center P of curvature of the dome-shaped portion 3c is located at the center of the vertical 10 height position of the electrically conductive portions. Accordingly, when a manipulating force is applied to the projection 2c, the key 2 pivots about a virtual pivoting (or rotation) center which is the spherical center P, and the leg 4c presses the bulge 5c downwards approximately in the vertical direction. As a result, the bulge 5c is resiliently deformed and the electrically conductive portion thereof makes electrical contact with the corresponding electrical contact 6c.

In the standby state where the operator's finger is placed on the key 2, the key 2 is already displaced downwards by the distance corresponding to the gap s, and the bottom surface 2g of the key 2 is in contact with the top surface of the dome-shaped portion 3b. Hence, the distance between the electrically conductive portion of the bulge 5c and the electrical contact 6c is already reduced to g-s. Accordingly, when the projection 2c of the key 2 is pushed in this standby state, the bottom surface 2g of the key 2 slides on the top surface of the dome-shaped portion 3b, and the contact pressing member 4 is tilted by an amount such that the leg 4c is displaced downwards by the distance g-s. When the contact pressing member 4 tilts, the leg 4d is displaced upwards oppositely to the movement of the leg 4c within the corresponding cutout in the ring-shaped wall 3c of the upper half 3.

Therefore, even if the gap g is set so as to guarantee the automatic return of the key 2 from the tilted position to the home position, the tilting of the key 2 can be achieved by a relatively small force and the required stroke is small because the key 2 is tilted from the standby state described above. As a result, it is possible to improve the response characteristic of the control key device 1. That is, the light and smooth touch (so-called feather touch) key operation becomes possible, and a quick operation of the key 2 becomes possible.

Furthermore, since the stroke required to tilt the key 2 from the standby state is small, it is possible to minimize the gap between the key 2 and the side wall defining the cavity 3e of the upper half 3 surrounding the key 2. This minimized gap reduces the space required to provide the key 2. In addition, it is possible to prevent dust particles or the like from easily entering within the control key device 1 via this minimized gap, and also prevent the operator's finger tip from being caught within the minimized gap.

On the other hand, when the operator releases the tilted key 2, the resilient restoration force of the bulge 5c of the resilient member 5 pushes the leg 4c of the contact pressing member 4 upwards. Hence, the contact pressing member 4 is displaced upwards until the spherical surface portion 4e makes contact with the bottom surface of the dome-shaped portion 3b. In addition, the bottom surface 2g of the key 2 separates from the top surface of the dome-shaped portion 3b, and the key 2 returns to the home position shown in FIG. 18.

Figure 21:
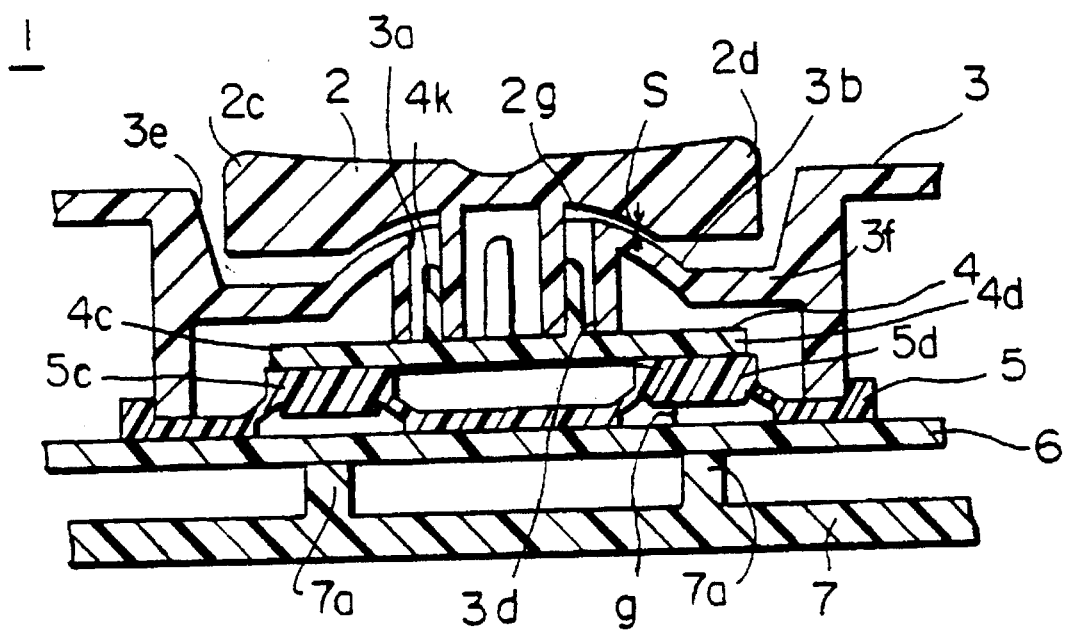
FIG. 21 is a cross sectional view showing a tenth embodiment of the control key device according to the present invention.

Next, a description will be given of a tenth embodiment of the control key device according to the present invention, by referring to FIGS. 21 and 22. FIG. 21 is a cross sectional view showing the tenth embodiment, and FIG. 22 is a perspective view showing the tenth embodiment in a disassembled state. In FIGS. 21 and 22, those parts which are the same as those corresponding parts in FIGS. 18 through 20 are designated by the same reference numerals, and a description thereof will be omitted.

This tenth embodiment is basically the same as the ninth embodiment, except that the contact pressing member 4 of this tenth embodiment does not have the spherical surface portion 4e.

As shown in FIGS. 21 and 22, the contact pressing member 4 includes a boss portion 4k which is provided with the projection 4g which extends in the vertical direction. The stem portion 2e of the key 2 is press-fit into the boss portion 4k in a state where the projection 4g fits into the cutout 2f. The outer diameter of the boss portion 4k is smaller than the inner diameter of a ring-shaped wall portion 3d of the upper half 3 so that the key 2 is free to tilt from the home position.

When the operator releases the key 2 from the tilted position, the legs 4a through 4d of the contact pressing member 4 is returned to the level state due to the action of the resilient restoration force exerted by the resilient member 5. When the contact pressing member 4 returns to the level state, this contact pressing member 4 is maintained at the central position within the cavity of the casing 100 by the action of the cutouts in the ring-shaped wall 3c corresponding to the legs 4a through 4d, and the top surface of the contact pressing member 4 makes contact with the lower end of the ring-shaped wall portion 3d of the upper half 3. Since the legs 4a through 4d of the contact pressing member 4 are respectively guided by the cutouts in the ring-shaped wall 3c, the contact pressing member 4 can always be maintained at the central position (neutral position) in the home position of the key 2. In this home position of the key 2, the gap s described above is formed between the bottom surface 2g of the key 2 and the top surface of the dome-shaped portion 3b.

According to this tenth embodiment, it is possible to obtain substantially the same effects as in the case of the ninth embodiment described above.

In the described embodiments, the stem portion 2e of the key 2 is secured on the contact pressing member 4. However, it is of course possible to provide the stem portion on the contact pressing member 4 and secure this stem on the key 2.

In addition, although the dome-shaped portion 3b has a continuous surface in the described embodiments, it is possible to provide openings in the dome-shaped portion 3b as long as the required rigidity and strength can be obtained. Similarly, it is also possible to provide openings in the spherical surface portion 4e if the required rigidity and strength can be obtained.

Moreover, although 4 electrical contacts are provided in the described embodiments, the number of electrical contacts and the corresponding bulges of the resilient member is of course not limited to 4.

In the embodiments described above, the physical fulcrum of the key which tilts is not located on the wiring board (or substrate). For this reason, it is possible to prevent an undesired external force from being applied on the wiring board even if the external force is applied on the key. By preventing the undesirable external force from reaching the wiring board, it is possible to prevent damage to the wiring and contacts provided on the wiring board. In other words, in the described embodiments, the key is not tilted about a physical point, but is tilted while being guided by at least a dome-shaped or curved surface of the casing.

In addition, it is of course possible to combine the structures of the various embodiments described above.

Further, the present invention is not limited to these embodiments, but various variations and modifications may be made without departing from the scope of the present invention.

What is claimed is
1. A control key device comprising:
    a casing having a generally dome-shaped portion provided at an arbitrary part of the casing, said dome-shaped portion having a top surface with a spherical curvature and a through hole provided at a central part of the dome-shaped portion;
    a substrate provided within said casing and having a plurality of electrical contact portions, each of said electrical contact portions having a pair of electrical contacts;
    a resilient member provided on said substrate and having a plurality of bulges at positions corresponding to said electrical contact portions, each of said bulges having an electrically conductive portion which makes electrical contact with a corresponding one pair of the electrical contacts when the bulge is resiliently deformed;
    a contact pressing member provided on said resilient member and having a plurality of legs at positions corresponding to said bulges;
    a key member secured on said contact pressing member via said through hole in the dome-shaped portion of said casing, said key member having a home position and a tilted position,
    said contact pressing member being approximately level and said legs resting on the corresponding bulges in the home position of said key member when said key member is free of a pressing force,
    one of said legs resiliently deforming the corresponding bulge to achieve electrical contact between the corresponding one pair of the electrical contacts in the tilted position of said key member when said key member receives a pressing force,
    said key member having a sliding surface facing, and having a spherical curvature meeting, to said top surface,
    the tiling of said key member being guided by the movable contact of said sliding surface with said top surface; and
    a supporting member mounted under said substrate for supporting portions of said substrate at which said plurality of electrical contact portions are formed.
2. The control key device as claimed in claim 1, which further comprises preventing means for preventing said key member from sticking at the tilted position or an intermediate position between the tilted position and the home position.
3. The control key device as claimed in claim 2, wherein said preventing means includes a lubricant film provided between the sliding surface of said key member and the top surface of the dome-shaped portion of said casing.
4. The control key device as claimed in claim 2, wherein said preventing means includes a lubricative surface of at least one of the sliding surface of said key member and the top surface of the dome-shaped portion of said casing.
5. The control key device as claimed in claim 2, wherein said preventing means includes a first gap formed between the sliding surface of said key member and the top surface of the dome-shaped portion of said casing at the home position of said key.
6. The control key device as claimed in claim 5, wherein said key member has a standby state in which the sliding surface of said key member makes contact with the top surface of the dome-shaped portion of said casing, and said key member is tilted to the tilted position from said standby state.
7. The control key device as claimed in claim 1, wherein said casing includes a wall having cutouts for guiding the legs of said contact pressing member so that said contact pressing member is maintained in a central position at the hole in the dome-shaped portion of said casing.
8. The control key device as claimed in claim 1, wherein said casing includes a wall portion having an end which makes contact with said contact pressing member so that said contact pressing member is maintained level at the home position of said key member.
9. The control key device as claimed in claim 2, wherein:
    said contact pressing member includes a generally spherical surface portion which makes sliding contact with a bottom surface of the dome-shaped portion of said casing, said key member, said dome-shaped portion of said casing, and said spherical surface portion of said contact pressing member being coaxially provided.

10. The control key device as claimed in claim 9, wherein said preventing means includes a lubricant film provided between the spherical surface portion of said contact pressing member and the bottom surface of the dome-shape portion of said casing.

11. The control key device as claimed in claim 9, wherein said preventing means comprises:

a first gap formed between the sliding surface of said key member and the top surface of the dome-shaped portion of said casing at the home position of said key member; and a second gap formed between the electrically conductive portion of each of said bulges of said resilient member and the corresponding electrical contact of said substrate at the home position of said key member, said second gap being greater than said first gap.

12. The control-key device as claimed in claim 9, wherein said preventing means includes a cutout portion in the spherical surface portion of said contact pressing member provided at a position corresponding to an edge of the dome-shaped portion of said casing.

13. The control key device as claimed in claim 9, wherein said preventing means includes a rounded portion provided at an edge of the dome-shaped portion of said casing, said rounded portion having a radius of curvature greater than that of the bottom surface of the dome-shaped portion of said casing.

14. The control key device as claimed in claim 9, wherein a maximum horizontal distance between a center axis of said key member and the bottom surface of spherical surface portion of said contact pressing member is smaller than a horizontal distance between the center axis and an inner edge of the bulge of said resilient member.

15. The control key device as claimed in claim 9, wherein said key member has a standby state in which the sliding surface of said key member makes contact with the top surface of the dome-shaped portion of said casing, and said key member is tilted to the tilted position from said standby state.

16. A control key device comprising:

a casing having a generally dome-shaped portion provided at an arbitrary part of the casing, said dome-shaped portion having a top surface with a spherical curvature and a through hole provided at a central part of the dome-shaped portion;

a substrate provided within said casing and having a plurality of electrical contact portions;

a resilient member provided on said substrate and having a plurality of bulges at positions corresponding to the electrical contact portions, each of said bulges having an electrically conductive portion which makes electrical contact with a corresponding one of the electrical contact portions when the bulge is resiliently deformed;

a contact pressing member provided on said resilient member and having a plurality of legs at positions corresponding to the bulges of said resilient member; and a key member secured on said contact pressing member via said through hole in the dome-shaped portion of said casing, said key member having a home position and a tilted position, said contact pressing member being approximately level and the legs resting on the corresponding bulges of said resilient member in the home position of said key member, one of the legs of said contact pressing member resiliently deforming a corresponding one of the bulges of said resilient member to achieve electrical contact between the electrically conductive portion of said corresponding one bulge and a corresponding one of the electrical contact portions of said substrate in the tilted position of said key member, said key member having a sliding portion which makes sliding contact with the top surface of the dome-shaped portion of said casing when tilting to the tilted position and being automatically returned from the tilted position to the home position by the resilient restoration force exerted by said resilient member, the sliding portion of said key member being positioned closely spaced from the top surface of the dome-shaped portion of said casing at the home position, at least the tilting of said key member from the home position to the tilted position being substantially guided by the top surface of the dome-shaped portion as the sliding portion makes sliding contact with said top surface, so that an external force applied on said key member is distributed on said dome-shaped portion and is prevented from being applied directly on said substrate.

17. A control key device comprising:

a substrate having a pair of electrical contact portions formed on a surface of said substrate, each of said electrical contact portions having a pair of separate electrical contacts;

a pair of movable contact means formed on said surface of said substrate in correspondence with said pair of electrical contact portions, each of said movable contact means having a conductive layer and a resilient means supporting said conductive layer, said movable contact means being disposed so that said conductive layers are closely spaced from the corresponding separate electrical contacts;

a guiding member mechanically fixed to said substrate, said guiding member having an outer surface, an inner space and a through hole, said through hole being registered to a center portion located between said pair of electrical contact portions at said surface of the said substrate, said outer surface having at least a pair of first sliding surface portions disposed so that said through hole is located therebetween and constituting part of a spherical surface; and a control means having a key-top portion and a pair of force-conducting portions, said key-top portion having a pair of second sliding surface portions facing to, and having a surface curvature meeting to, said pair of first sliding surface portions, said pair of force-conducting portions being positioned within said inner space and respectively contacting the corresponding movable contact means, said pair of force-conducting portions being mechanically connected with said key-top portion through said through hole, said control means being elastically supported by said movable contact means so that said second sliding surface portions are closely spaced from said first sliding surface portions.

18. A control key device comprising:

a substrate having two pairs of electrical contact portions formed on a surface of said substrate and located symmetrically with respect to a center position, each of said electrical contact portions having a pair of separate electrical contacts;

a first member having two pairs of protuberant portions corresponding to said two pairs of electrical contact portions and placed on said substrate, each of said protuberant portions having a conductive layer and a resilient means supporting said conductive layer, said two pairs of protuberant portions being disposed so that said conductive layers are closely spaced from the corresponding pair of separate electrical contacts;

a second member mechanically fixed to said substrate, said second member having an outer surface, an inner space and a circular through hole, the imaginary center of said circular through hole being registered to said center position on said substrate, said outer surface having a first sliding surface portion which locates around said circular through hole and has a shape constituting part of a spherical surface; and a third member having a first portion, a second portion, and two pairs of third portions, said first portion having a second sliding surface portion facing, and having a surface curvature meeting, to said first sliding surface portion, said two pairs of third portions being disposed within said inner space and respectively on the corresponding protuberant portions, said second portion including a cylindrical portion the sectional diameter of which is smaller than the diameter of said circular through hole to allow said third member to tilt, said cylindrical portion of said second portion mechanically connecting said two pairs of said third portions with said first portion through said circular through hole, said third member being elastically supported by said two pairs of protuberant portions so that said first sliding surface portion is closely spaced from said second sliding surface portion.

19. The control key device as claimed in claim 18, wherein said second member further comprises a third sliding surface portion facing said inner space, said third sliding surface portion being located around said circular through hole, having a shape constituting part of a spherical surface and extending substantially in parallel with said first sliding surface portion, wherein said third member further comprises a fourth portion mechanically connected to said second portion and having a fourth sliding surface portion facing, and having a surface curvature meeting, to said third sliding surface portion.

20. A control key device comprising:

a substrate having two pairs of electrical contact portions formed on a surface of said substrate and disposed symmetrically with respect to a center position, each of said electrical contact portions having a pair of separate electrical contacts;

a first member having two pairs of protuberant portions corresponding to said two pairs of electrical contact portions and placed on said substrate, each of said two pairs of protuberant portions having a conductive layer and a resilient means supporting said conductive layer, said two pairs of protuberant portions being formed so that said conductive layers are closely spaced from the corresponding pair of separate electrical contacts;

a second member mechanically fixed to said substrate, said second member having an outer surface, an inner space and a circular through hole, the imaginary center line of said circular through hole being registered to said center position on said substrate, said outer surface having a first sliding surface portion which surrounds said circular through hole and has a shape constituting part of a spherical surface;

a third member located within said inner space and having two pairs of force-conducting portions, said two pairs of force-conducting portions being disposed symmetrically with respect to an imaginary center line and respectively on the corresponding protuberant portions so that said imaginary center line of said third member is registered to said center position on said substrate and to said imaginary center line of said circular through hole, said third member further having a cylindrical hole the imaginary center line of which is registered to said imaginary center line of said third member; and a fourth member located on said second member, said fourth member having a second sliding surface portion facing, and having a surface curvature meeting, to said first sliding surface portion, said fourth member further having a cylindrical projection extending through said circular through hole and being fitted in said cylindrical hole whereby said fourth member is mechanically connected to said two pairs of force-conducting portions, said cylindrical projection having a sectional diameter which is smaller than the diameter of said circular through hole to allow said fourth member to tilt, said fourth member being movably supported by said protuberant portions so that said second sliding surface portion is closely spaced from said first sliding surface portion while said fourth member is free of a pressing force.

21. The control key device as claimed in claim 19, wherein said second member further comprises a third sliding surface portion facing said inner space, said third sliding surface portion surrounding said circular through hole, having a shape constituting part of a spherical surface and extending substantially in parallel with said first sliding surface portion, wherein said third member further comprises a fourth sliding surface portion facing, and having a surface curvature meeting, to said third sliding surface portion, wherein said third sliding surface portion movably contacts said fourth sliding surface portion while said fourth member is free of a pressing force.

22. A control key device comprising:

a substrate having two pairs of electrical contact portions disposed on a surface of said substrate symmetrically with respect to a center position, each of said electrical contact portions having a pair of separate electrical contacts;

a first member having two pairs of protuberant portions corresponding to said two pairs of electrical contact portions and disposed on said substrate, each of said two pairs of protuberant portions comprising:

a disk shaped top portion, a conductive layer formed on a surface of said disk shaped top portion a resilient means supporting said conductive layer and said disk shaped top portion so that the conductive layer is closely spaced from the corresponding pair of separate electrical contacts;

a second member mechanically fixed to said substrate, comprising:

an outer surface having a first sliding surface portion with a shape constituting part of a spherical surface, an inner space, a circular through hole, the imaginary line of said circular through hole being registered to said center position on said substrate and surrounded by said first sliding surface portion, and a second sliding surface portion facing said inner space, surrounding said circular through hole, having a shape constituting part of a spherical surface and extending substantially in parallel with said first sliding surface portion;

a third member located within said inner space, comprising:

a third sliding surface portion facing, and having a surface curvature meeting, to said second sliding surface portion, two pairs of legs disposed symmetrically with respect to an imaginary center line and rested respectively on the corresponding disk shaped top portions so that said imaginary center line of said third member is registered to said center position on said substrate and to said imaginary center line of said circular through hole, each of said legs protruding from a bottom edge of said third sliding surface portion and extending respectively in parallel to the corresponding disk shaped top portion so that the inner edge of the disk shaped top portion facing said imaginary center line is located farther in the distance from said imaginary center line than said bottom edge of said sliding surface, and a cylindrical hole the imaginary center line of which is registered to said imaginary center line of said third member; and a fourth member disposed on said second member, comprising:

a fourth sliding surface portion facing, and having a surface curvature meeting, to said first sliding surface portion, and a cylindrical projection extending through said through hole and being fitted in said cylindrical hole whereby said fourth member is mechanically connected to said two pairs of legs, said cylindrical projection having a sectional diameter which is smaller than the diameter of said circular through hole to allow said fourth member to tilt.

23. The control key device as claimed in claim 22, wherein said fourth member is movably supported by said protuberant portions so that said fourth sliding surface portion is closely spaced from said first sliding surface portion while said fourth member is free of a pressing force.

24. A control key device comprising:

a substrate having a plurality of electrical switch terminals formed on a surface portion of said substrate;

a plurality of movable contact means mounted on the surface of said substrate in correspondence with said plurality of electrical switch terminals, each of said movable contact means having a resilient means and a conductive layer supported by said resilient means in closely space relationship with the corresponding switch terminal;

a guiding means with a guiding surface and a first stopper member mounted to said substrate so that the surface portion of said substrate at which said switch terminals are formed is substantially isolated from forces conducted to said guiding means; and a manually controllable input means having a second stopper member, a plurality of force-conducting portions and a key-top member with a support surface mated with said guiding surface for allowing said input means to tilt, said force-conducting portions being located so as to contact the corresponding movable contact means, said input means being movably mounted to said guiding means and said movable contact means so that when said key-top member is free of an operating force said second stopper member contacts said first stopper member and said support surface is closely spaced from said guiding surface.

25. A control key device comprising:

a substrate having a plurality of electrical switch terminals formed on a surface portion of said substrate;

a plurality of movable contact means mounted on the surface of said substrate in correspondence with said plurality of electrical switch terminals, each of said movable contact means having a resilient means and a conductive layer supported by said resilient means in closely spaced relationship with the corresponding switch terminal so that the displacement of the resilient means to move the conductive layer into engagement with the switch terminal;

a guiding member having a guiding surface and mounted to said substrate so that said surface portion of the substrate is substantially isolated from forces conducted to said guiding member;

a manually controllable input means having a plurality of force-conducting members and a key-top member with a support surface mated with said guiding surface for allowing said input means to tilt, said force-conducting members being located on said movable contact means so that said input means is movably supported by said movable contact means; and a supporting member mounted under said substrate for supporting portions of said substrate at which said plurality of electrical switch terminals are formed.

26. A multi-directional switch assembly comprising:

a printed circuit board having a plurality of switch terminals;

a plurality of movable electrical contact elements supported by resiliently deformable means on said printed circuit board with said contact elements superimposed with respect to and spaced apart from said switch terminals;

a manually engageable input member mounted proximate said printed circuit board; and a guiding member mounted under said input member in spaced relation with said printed circuit board so as to substantially isolate said printed circuit board from forces applied to said input member;

said guiding member and said input member having mating surfaces to allow said input member to tilt thereabout for the displacement of said resiliently deformable means by an amount sufficient to move said contact elements into engagement with said switch terminals, said input member being movably supported by said resiliently deformable means so that said mating support surfaces are closely spaced to each other where said input member is free of forces.

27. A multi-directional switch assembly comprising:

a printed circuit board having a plurality of switch terminals;

a plurality of movable electrical contact elements supported by resiliently deformable means on said printed circuit board with said contact elements superimposed with respect to and spaced apart from said switch terminals;

a manually engageable input member mounted proximate said printed circuit board and movably supported by said resiliently deformable means;

a guiding member mounted under said input member in spaced relation with said printed circuit board so as to substantially isolate said printed circuit board from forces applied to said input member, said guiding member and said input member having mating surfaces to allow said input member to tilt thereabout for the displacement of said resiliently deformable means by an amount sufficient to move said contact elements into engagement with said switch terminals; and a supporting member mounted under said printed circuit board for supporting portions of said printed circuit board at which said plurality of electrical switch terminals are formed.

28. A multi-directional switch assembly comprising:

a printed circuit board having a plurality of switch terminals;

a plurality of movable electrical contact elements supported by resiliently deformable means on said printed circuit board with said contact elements superimposed with respect to and closely spaced from said switch terminals;

a manually engageable input member mounted proximate said printed circuit board;

a projecting member disposed under said input member; and a holder member formed integrally with said projecting member so as to hold said projecting member in a spatially fixed position between said printed circuit board and said input member;

said input member being movably supported by said resiliently deformable means so as to be closely spaced apart from said projecting member when said input member is free of a manipulating force and so as to tilt in response to a manipulating force applied thereto to cause displacement of said resiliently deformable means by an amount sufficient to move said contact elements into engagement with said switch terminals.

29. The multi-directional switch assembly as claimed in claim 28, which further comprises:

a casing enclosing said printed circuit board, said contact elements and said input member, said casing having a side wall defining a cavity at which an upper surface of said input member is exposed to the outside of said casing so that a manipulating force is applied to said input member, said holding member being formed as an integral part of said casing and extending from the side wall defining the cavity of said casing.

30. The multi-directional switch assembly as claimed in claim 28, further comprises:

a supporting member mounted under said printed circuit board.

31. A control key device comprising:

a substrate having a plurality of electrical switch terminals formed on a surface portion of said substrate;

a plurality of movable contact means mounted on the surface of said substrate in correspondence with said plurality of electrical switch terminals, each each of said movable contact means having a resilient means and a conductive layer supported by said resilient means in closely spaced relationship with the corresponding switch terminal;

a manually controllable input means movably mounted on said movable contact means;

a stopper member with a convex surface, said stopper member being disposed under said input means; and a holding member with said stopper member formed as an integral part thereof, said holding member holding said stopper member in a spatially fixed position between said substrate and said input means, said input means being movable supported by said resilient means so as to be closely spaced apart from said stopper member when said input means is free of a manipulating force and so as to tilt in response to a manipulating force applied thereto to cause the resilient means displaced by an amount sufficient to move one of said conductive layers into engagement with the corresponding switch terminal.

32. The control key device as claimed in claim 31, which further comprises:

a casing enclosing said substrate, said movable contact means and said input means, said casing having a side wall defining a cavity at which an upper surface of said input member is exposed to the outside of said casing so that a manipulating force is applied to said input member, said holding member being formed as an integral part of said casing and extending from the side wall defining the cavity of said casing.

33. The control key device as claimed in claim 31, wherein said input means has a concave surface with which tile convex surface of said input means comes in contact.

34. The control key device as claimed in claim 32, which further comprises:

a supporting member mounted under said substrate.

* * * * *

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

Title Page delete the drawing of the prior art as shown on the title page and substitute the following drawing corresponding to Figure 11:

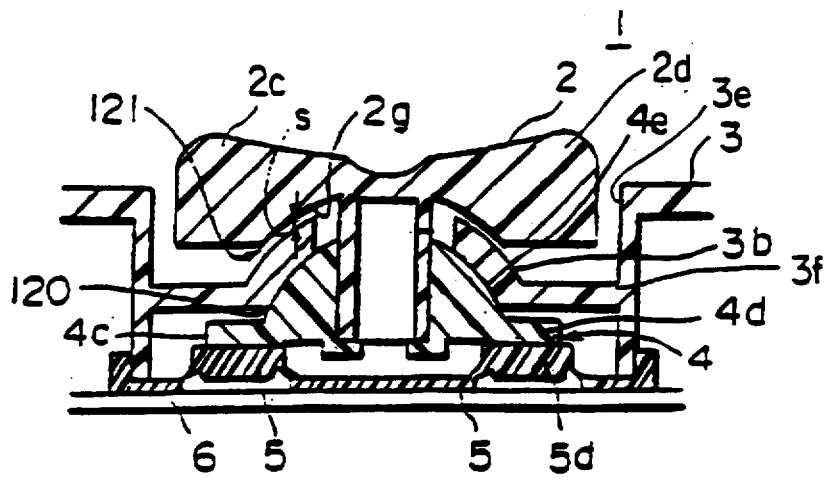

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

column 1, line 5, insert a space between "number" and "083,670"

line 61, delete the word "of" (first occurrence) and substitute the word

--on-- column 2, line 5, insert the word --if-- between "Even" and "the"

line 14, insert the word --if-- between "Then," and "the operator"

line 34, change "so a strong force" to read --so strong a force-- line 35, change "wirings themselves" to read --the wiring itself-- line 50, the text after the word "comprises:" should start a new paragraph and should be indented to conform to line 58 column 3, line 18, change "comprises" to read --comprise-- lines 22-23, delete "with effect"

line 32, change "of" to --or-- column 5, line 15, insert --a-- before "plan view"

line 58, change "FIG" to --FIGS--

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

| | | |
|---|---|---|
| column 6, | line 2, | delete "a" between the numbers "2b" and "2c" and substitute a comma |
| | line 5, | delete the first word "conductive" |
| | line 9, | change "(in FIG. 2)" to --(seeFIGS. 2 and 3)--. |
| | line 11, | change "as result" to --as a result-- |
| | line 26, | change "The pairs" to --The pairs of -- |
| | line 54, | change "Each of the projection" to --Each of the projections-- |
| | line 67, | delete the colon and add a period |
| column 7, | line 2, | delete the quotation mark after "5c" |
| | line 31, | delete "effects so as to make" to -- makes --. |
| | line 54, | insert a space between "FIG." and "2" |
| | line 63, | change "come in" to --coming in-- |

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

column 8, line 3, change "wiring themselves" to --the wiring itself-- line 13, change "manner same" to --same manner-- line 24, change "portion" to --portions-- line 32, change "teads" to --tends-- line 32, change "the its" to --its-- line 34, change "pushes" to --pushing-- line 35, change "portions" to --portion-- line 40, change "portions" to --portion-- line 43, change "the its" to --its-- line 45, change "the its" to --its-- line 57, insert --the-- before "corresponding"

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

column 9,    line 1,    change "the its" to --its-- line 11,  change "in" to --into-- line 42,  change "the its" to --its-- lines 61 and 62, delete "easily" on line 62 and add --easily-- before "offers" on line 61 column 10,  line 36,  change "the its" to --its-- lines 43 and 44, delete "easily" on line 44 and add --easily-- before "offers" on line 43 line 47,  change "has" to --having-- line 49,  delete "and"

line 63,  change "contract" to --contact--

UNITED STATES PATENT AND TRADEMARK OFFICE
CERTIFICATE OF CORRECTION

PATENT NO. : 5,498,843

DATED : MARCH 12, 1996

INVENTOR(S) : DATE ET AL.

Page 6 of 9

It is certified that error appears in the above-indentified patent and that said Letters Patent is hereby corrected as shown below:

column 11,    line 23,   change "functions" to --function-- line 43,   change "from top" to --from a top-- line 55,   change "bulge" to --bulges-- line 56,   change the comma after "5d" to a period lines 64-65, change "constitute" to --constitutes-- column 12,    line 8,    insert a period after "FIG. 13"

line 38,   delete "pressinge"

column 13,    line 16,   delete "contact"

line 18,   change "hundered" to --hindered-- column 14,    line 43,   change "bottom surface of the spherical line portion" to --bottom line of the spherical surface portion-- column 15,    line 8,    delete "surrounding" (first occurrence)

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

column 15, line 17, insert --a-- before "satisfactory"

line 27, change "FIGS. 18 through 11" to --FIGS. 10 through 18-- line 55, change "key 4" to --key 2-- line 67, change "5a" to --5c-- column 19, line 30, change "4" to --four-- line 33, change "4" to --four--

Claim 1, column 19, lines 54-55, delete the phrase "provided at an arbitrary part of the casing"

column 20, line 23, change "tiling" to --tilting--

Claim 4, column 20, line 40, change "surface" to --surfaces--

Claim 5, column 20, line 46, change "key" to --key member--

Claim 10, column 21, line 7, change "dome-shape" to --dome-shaped--

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

Claim 14, column 21, line 33, insert --the-- between the words "of" and "spherical"

Claim 22, column 24, line 53, insert the following phrase after the words "top portion": --facing the corresponding electrical contact portion, and--

Claim 24, column 25, line 54, change "space" to --spaced--

Claim 25, column 26, line 14, insert --a-- before "closely"

column 26, line 16, change "to move" to --moves--

Claim 26, column 26, line 43, insert --a-- before "spaced"

Claim 31, column 28, line 10, delete "each" (second occurrence)

Claim 31, column 28, line 23, change "movable" to --movably--

Claim 33, column 28, line 45, change "tile" to --the--

UNITED STATES PATENT AND TRADEMARK OFFICE
CERTIFICATE OF CORRECTION

PATENT NO. : 5,498,843
DATED : MARCH 12, 1996
INVENTOR(S) : DATE ET AL.

It is certified that error appears in the above-indentified patent and that said Letters Patent is hereby corrected as shown below:

In the Drawings

Figure 18, change "S" to lower case --s--

Figure 21, change "S" to lower case --s--

Signed and Sealed this

Twenty-fifth Day of February, 1997

Attest:

BRUCE LEHMAN

*Attesting Officer*     *Commissioner of Patents and Trademarks*